(12) United States Patent
Yang et al.

(10) Patent No.: US 8,027,378 B1
(45) Date of Patent: Sep. 27, 2011

(54) CIRCUITS, ARCHITECTURES, APPARATUSES, SYSTEMS, ALGORITHMS AND METHODS AND SOFTWARE FOR AMPLITUDE DROP DETECTION

(75) Inventors: Shaohua Yang, San Jose, CA (US); Hongwei Song, Longmont, CO (US); Zining Wu, Los Altos, CA (US)

(73) Assignee: Marvell International Ltd., Hamilton (BM)

( * ) Notice: Subject to any disclaimer, the term of this patent is extended or adjusted under 35 U.S.C. 154(b) by 1136 days.

(21) Appl. No.: 11/818,079

(22) Filed: Jun. 12, 2007

Related U.S. Application Data

(60) Provisional application No. 60/817,275, filed on Jun. 29, 2006.

(51) Int. Cl.
*H04B 3/46* (2006.01)
*H04B 17/00* (2006.01)
*H04Q 1/20* (2006.01)

(52) U.S. Cl. ........................ 375/224; 375/213
(58) Field of Classification Search ............. 375/224
See application file for complete search history.

(56) References Cited

U.S. PATENT DOCUMENTS

| | | | | |
|---|---|---|---|---|
| 4,934,376 A | * | 6/1990 | Armington | 600/509 |
| 5,469,306 A | * | 11/1995 | Hara | 360/65 |
| 6,061,494 A | * | 5/2000 | Kikuchi | 386/47 |
| 6,671,667 B1 | * | 12/2003 | Chandran et al. | 704/233 |
| 7,366,461 B1 | * | 4/2008 | Brown | 455/3.06 |
| 2004/0095510 A1 | * | 5/2004 | Suzuki et al. | 348/465 |
| 2005/0097273 A1 | * | 5/2005 | Kanai | 711/114 |
| 2006/0171318 A1 | * | 8/2006 | Bergamasco et al. | 370/235 |
| 2006/0176989 A1 | * | 8/2006 | Jensen | 375/350 |
| 2007/0029994 A1 | * | 2/2007 | Dembo | 324/158.1 |
| 2008/0061842 A1 | * | 3/2008 | Paraschou et al. | 327/77 |

* cited by examiner

*Primary Examiner* — Dac Ha
*Assistant Examiner* — Erin File

(57) ABSTRACT

Methods, circuits, systems, and networks for detecting an amplitude drop in an incoming signal. The methods generally comprise sampling the incoming signal at regular intervals to produce a plurality of sample values, producing a plurality of drop flags in response to the plurality of sample values, and detecting the amplitude drop in response to at least two of the drop flags. The circuits generally comprise a sampling circuit configured to produce a sample signal in response to the incoming signal, a threshold circuit configured to receive the sample signal and to produce a drop flag signal in response to the sample signal, and a drop detection circuit configured to produce an amplitude drop signal in response to at least two values of the drop flag signal. The systems and networks generally comprise the present circuits and/or any circuit embodying the inventive concepts described herein. The present invention advantageously provides for detection of amplitude drops in an incoming signal, operating in the digital (rather than analog) domain. Embodiments of the present invention also reduce the incidence of "false positives" due to transient low amplitudes. Correct detection of amplitude drops can improve the accuracy of signal decoders.

30 Claims, 17 Drawing Sheets

CIRCUITS, ARCHITECTURES, APPARATUSES, SYSTEMS, ALGORITHMS AND METHODS AND SOFTWARE FOR AMPLITUDE DROP DETECTION

RELATED APPLICATIONS

This application claims the benefit of U.S. Provisional Application No. 60/817,275, filed Jun. 29, 2006, incorporated herein by reference in its entirety.

FIELD OF THE INVENTION

The present invention generally relates to the field of signal processing. More specifically, embodiments of the present invention pertain to methods and circuits for detecting amplitude drops in received signals, and systems and networks that utilize such detection.

DISCUSSION OF THE BACKGROUND

In modern signal processing (used, for example, in wireless data transmissions as well as magnetic and optical data storage, among many other applications) digital information is often encoded using an error correction code in order to facilitate the detection and correction of errors in noisy channels. Signal decoders are often implemented as finite state machines. When the signal is lost (e.g., the channel contains only noise, or the signal amplitude unexpectedly drops) the state of the decoder can be corrupted such that it will not be able to recover the transmitted data. An entire sector or block of data after the dropped signal may be lost due to this corrupted state, even if only a relatively small portion of the signal is lost.

Referring now to FIG. 1, model 100 of a typical channel detecting and decoding is shown. The waveform generator 101 mathematically models the received signal and signal amplitude defect. The received signal could be corrupted by media noise 102 and electric additive Gaussian noise 104. Scalar 103 represents an amplitude drop in the data signal (e.g., a reduction in the amplitude of the signal according to a ratio a). Noise generator 104 represents the addition of random noise $n_k$ to the channel. Loops block 105 represents filters to extract the signal from the channel before the signal is decoded, such as band-pass filters, analog-to-digital conversion (ADC), timing recovery, and finite impulse response (FIR) filters. Detector 110 and decoder 111 generally do not know the length and magnitude of the amplitude drop defect a, and attempt to recover the data from the received signal.

For channels with inter-symbol interference or data encoded by a convolutional code, a trellis based detector is conventionally used to detect data that is "hidden" in the received signal. For example, Viterbi detector 110 generally detects at least one most likely data sequence based on the received signal. In some implementations, the data is encoded with an outer code before transmission. The receiver may include an outer decoder 111 to correct errors that the Viterbi detector cannot recover. In some further implementations, the outer decoder 111 may be an iterative decoder which receives detection reliability values (e.g., values representing the statistical probability that a decoded sequence is correct) as input. Detection reliability values may be conventionally generated by a Viterbi detector using a soft output Viterbi algorithm (SOVA).

Referring now to FIG. 2A, graph 200 shows signal samples of an incoming signal (e.g., the output of waveform generator 101). In region 201, the data is erased from the channel. Thus, from approximately bit index 3300 to 3400, the incoming waveform is primarily made up of noise signal $n_k$. Referring now to FIG. 2B, graph 200' shows an expanded view of the incoming signal from bit index 3260 to bit index 3460. When the data signal is dropped from the channel, detector 110 cannot produce correct output. Thus, graph 210 in FIG. 2C shows locations in the bit stream where convolutional decoder 110 produces an erroneous output. FIG. 2C demonstrates that when the data signal is lost (e.g., from about bit index 3300 to about bit index 3400), detector 110 produces essentially random output, wherein about half of the output bits are in error. When the detector produces errors, the decoder 111 can be disrupted, which may corrupt an entire segment or sector of the decoded data.

Therefore, it is desirable to detect when the data signal has been lost from a channel, and to signal the decoder(s) to stop decoding or otherwise perform special processing on that segment of the signal so that further decoding (which may depend on the correctness of prior decoding) is not corrupted. One conventional solution to the problem is to detect when the amplitude of the incoming signal from the channel suddenly drops.

As shown in graphs 200 and 200', the value of the sampled signal is constantly switching from a high level to a low level. Therefore, an analog envelope detector is often used to detect a drop in the amplitude of the signal. The output of the analog envelope detector may be modeled or otherwise implemented with a digital envelope detector according to the following equation:

$$V_t = \begin{cases} V_{t-1} - \alpha|s_t - V_{t-1}|, & \text{if } s_t \leq V_{t-1} \\ V_{t-1} + \beta|s_t - V_{t-1}|, & \text{otherwise} \end{cases} \quad (\text{EQ. 1})$$

where $V_t$ is an envelope value at time t, $S_t$ is the sample value of the input signal (e.g., from an FIR filter) at time t, α is a small value (e.g., 1/60) representing a low pass filter when the magnitude of $S_t$ is less than or equal to the previous envelope value (e.g., $V_{t-1}$) and β is approximately 1, representing an all pass filter when the magnitude of $S_t$ is greater than the previous envelope value.

According to this equation, as the sampled value of the signal decreases, the envelope value will decrease slowly. When the sampled value increases, the envelope value will immediately rise. Therefore, the fluctuations of the data signal generally will not significantly reduce the envelope value over time, while a true amplitude drop (e.g., an amplitude drop of sufficient duration) will decrease the envelope over time. Referring now to FIG. 2D, graph 240 shows an envelope value 241 over time. When the amplitude drops at approximately bit index 3300, envelope 241 slowly declines. When the signal is restored to the channel at approximately bit index 3420, the envelope is immediately restored to a high value. When the envelope falls below threshold 242, a drop flag may be triggered. In a conventional amplitude drop detector, an amplitude drop is detected when the envelope drops below a threshold, (e.g., threshold line 242 in FIG. 2D).

Such detectors are susceptible to the "low pass effect," wherein the envelope value is above the threshold value for some significant portion of the amplitude drop event (e.g., low pass slope 243 of graph 240). Referring now to FIG. 2E, graph 250 maps drop flags produced when the envelope falls below the threshold. Region 251 of graph 250 shows negative drop flags in the "low pass slope" region where an amplitude drop has occurred, but the envelope value has not yet fallen below the threshold. Region 252 of graph 250 shows the positive drop flags where the amplitude drop has occurred. Thus, the amplitude drop is not noted until some time after the amplitude drop occurs. Therefore, the detector and decoder may still receive invalid data for a significant period of time (e.g., the period of time represented by regions 251 in graph 250).

One solution to the "low pass effect" is to increase the threshold. FIG. 2F shows graph 260 of an envelope 261 and threshold 263. As shown in graph 260, increasing the threshold increases the risk that transitory decreases in the envelope that do not represent an amplitude drop may trigger an amplitude drop flag. For example, in region 262 of graph 260, envelope 261 falls beneath threshold 263 for a short period. Referring now to FIG. 2G, graph 270 is a time-magnified view of graph 260. As shown in graph 270, increasing the threshold 273 value decreases the duration of the low pass slope 272, but in region 262 of graph 260, envelope 261 also falls below threshold 263, even though it does not represent an amplitude drop.

Therefore, it is desirable to detect amplitude drops in the incoming signal on a channel as soon as possible, while minimizing the risk of introducing false alarms (e.g., false indications that an amplitude drop has occurred).

SUMMARY OF THE INVENTION

Embodiments of the present invention relate to methods and circuits for detecting an amplitude drop in an incoming signal, and systems and networks utilizing such detection. The methods generally comprise sampling the incoming signal at regular intervals to produce a plurality of sample values, producing a plurality of drop flags in response to the plurality of sample values, and detecting the amplitude drop in response to at least two of the drop flags. The circuits generally comprise a sampling circuit configured to produce a sample signal in response to the incoming signal, a threshold circuit configured to receive the sample signal and to produce a drop flag signal in response to the sample signal, and a drop detection circuit configured to produce an amplitude drop signal in response to at least two values of the drop flag signal. The systems and networks generally comprise the present circuits and/or any circuit embodying the inventive concepts described herein.

The present invention advantageously provides for detection of amplitude drops in an incoming signal, operating in the digital (rather than analog) domain. Embodiments of the present invention also reduce the incidence of "false positives" due to transient low amplitudes. Correct detection of amplitude drops can improve the accuracy of decoders.

These and other advantages of the present invention will become readily apparent from the detailed description of preferred embodiments below.

DETAILED DESCRIPTION OF THE PREFERRED EMBODIMENTS

Figure 1:
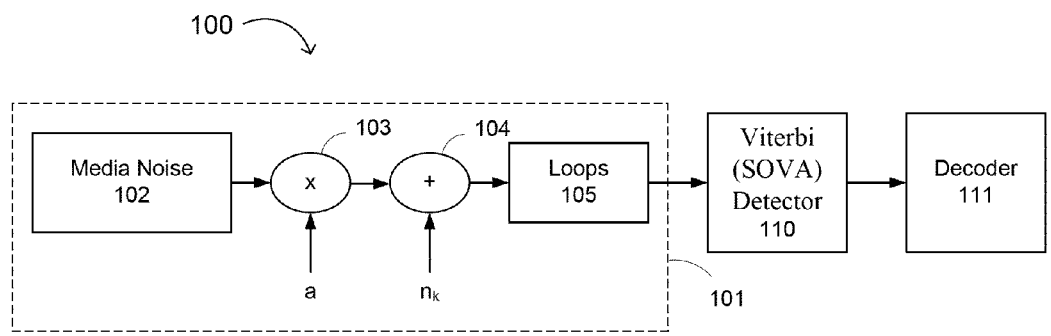
FIG. 1 is a diagram showing a conventional signal processor.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications, and equivalents that may be included within the spirit and scope of the invention as defined by the appended claims. Furthermore, in the following detailed description of the present invention, numerous specific details are set forth in order to provide a thorough understanding of the present invention. However, it will be readily apparent to one skilled in the art that the present invention may be practiced without these specific details. In other instances, well-known methods, procedures, components, and circuits have not been described in detail so as not to unnecessarily obscure aspects of the present invention.

Some portions of the detailed descriptions which follow are presented in terms of processes, procedures, logic blocks, functional blocks, processing, and other symbolic representations of operations on data bits, data streams, or waveforms within a computer, processor, controller, and/or memory. These descriptions and representations are generally used by those skilled in the data processing arts to effectively convey the substance of their work to others skilled in the art. A process, procedure, logic block, function, operation, etc., is herein, and is generally, considered to be a self-consistent sequence of steps or instructions leading to a desired and/or expected result. The steps generally include physical manipulations of physical quantities. Usually, though not necessarily, these quantities take the form of electrical, magnetic, optical, or quantum signals capable of being stored, transferred, combined, compared, and otherwise manipulated in a computer, data processing system, or logic circuit. It has proven convenient at times, principally for reasons of common usage, to refer to these signals as bits, waves, waveforms, streams, values, elements, symbols, characters, terms, numbers, or the like.

It should be borne in mind, however, that all of these and similar terms are associated with the appropriate physical quantities and are merely convenient labels applied to these quantities. Unless specifically stated otherwise and/or as is apparent from the following discussions, it is appreciated that throughout the present application, discussions utilizing terms such as "processing," "operating," "computing," "calculating," "determining," "manipulating," "transforming," "displaying" or the like, refer to the action and processes of a computer, data processing system, logic circuit or similar processing device (e.g., an electrical, optical, or quantum computing or processing device), that manipulates and transforms data represented as physical (e.g., electronic) quantities. The terms refer to actions, operations and/or processes of the processing devices that manipulate or transform physical quantities within the component(s) of a system or architecture (e.g., registers, memories, other such information storage, transmission or display devices, etc.) into other data similarly represented as physical quantities within other components of the same or a different system or architecture.

Furthermore, for the sake of convenience and simplicity, the terms "clock," "time," "rate," "period" and "frequency" are generally used interchangeably herein, but are generally given their art-recognized meanings. Also, for convenience and simplicity, the terms "data," "data stream," "waveform" and "information" may be used interchangeably, as may the terms "connected to," "coupled with," "coupled to," and "in communication with" (which terms also refer to direct and/or indirect relationships between the connected, coupled and/or communication elements unless the context of the term's use unambiguously indicates otherwise), but these terms are also generally given their art-recognized meanings.

The present invention concerns a method, circuit, and system for detecting an amplitude drop in an incoming signal. The method generally comprises sampling the incoming signal at regular intervals to produce a plurality of sample values, producing a plurality of drop flags in response to the plurality of sample values, and detecting the amplitude drop in response to at least two of the drop flags.

The circuit generally comprises a sampling circuit configured to produce a sample signal in response to the incoming signal, a threshold circuit configured to receive the sample signal and to produce a drop flag signal in response to the sample signal, and a drop detection circuit configured to produce an amplitude drop signal in response to at least two values of the drop flag signal. The system and network generally comprise the present circuit and/or any circuit embodying the inventive concepts described herein.

The invention, in its various aspects, will be explained in greater detail below with regard to exemplary embodiments.

Exemplary Methods

In one aspect, the present invention relates to a method of detecting an amplitude drop in an incoming signal, including the steps of sampling the incoming signal at regular intervals to produce a plurality of sample values, producing a plurality of drop flags in response to the plurality of sample values, and detecting the amplitude drop in response to at least two of the drop flags.

Figure 3A:
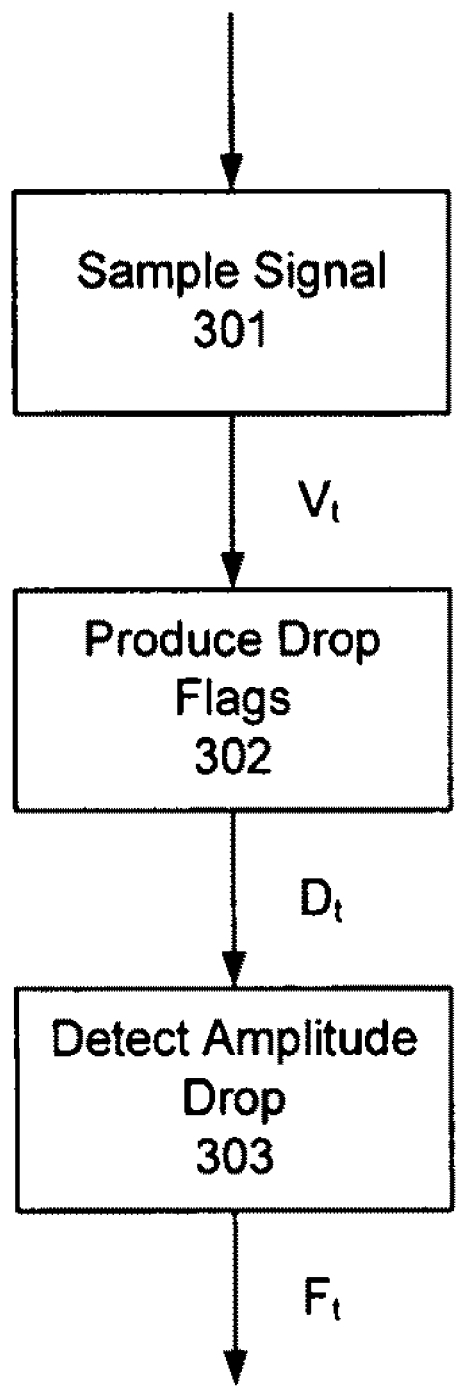
FIGS. 3A-B is a diagram showing an embodiment of an amplitude drop detector according to the present invention.

Referring now to FIG. 3A, the method generally comprises step 301 of sampling the incoming signal to produce sample value $V_t$, step 302 of producing drop flags in response to the sampled signal to produce drop flag $D_t$, and step 303 of detecting an amplitude drop to produce an amplitude drop value $F_t$ in response to at least two of the drop flags (e.g., $D_t$ and $D_{t-1}$). Amplitude drop value $F_t$ may then be provided to a signal decoder so that erroneous parts of the signal are not processed. The sample value $V_t$ may comprise an envelope value (e.g., an envelope value produced by the analog-like digital envelope detector described above), an absolute value of the incoming sampled signal, or any other representation of the sampled signal.

In one embodiment, the step of producing a plurality of drop flags comprises comparing at least one of the sample values to a first threshold value, and setting one of the drop flags to a first state when the sample value is below the first threshold. The drop flag may comprise a binary value, wherein a binary "1" may represent a sample that has fallen beneath the threshold, but a person skilled in the art may choose any suitable representation for this state. In another embodiment, the detecting step further comprises selecting a subset of the drop flags, and determining that an amplitude drop has occurred when the number of drop flags in the subset having a first state exceeds a second threshold. Thus, the method may comprise counting the number of consecutive positive drop flags (e.g., the number of drop flags having a binary, value of "1").

Figure 3B:
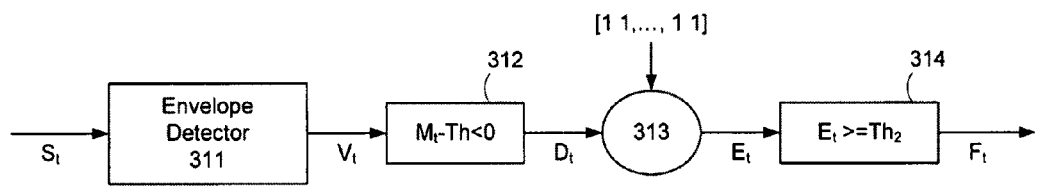

Referring now to FIG. 3B, an embodiment of the present method is shown. In step 311, an envelope of sample value $S_t$ may be detected to produce envelope value $V_t$. In step 312, envelope value $V_t$ may be compared to a threshold value, and drop flag $D_t$ may be set as described above. At step 313, a subset of drop flags (e.g., drop flags $D_{t-n}$ through $D_t$, where n is an integer of at least 1) may be accumulated. In one embodiment, the flags may be accumulated to produce the number of consecutive positive drop flags (e.g., the number of consecutive values of $D_t$ that indicate that the envelope has fallen below the threshold value) to produce value $E_t$. In one exemplary embodiment, the threshold number of sequential drop flags is four (4), but it will be recognized that any threshold value of at least two (2) may be chosen depending on the characteristics of the channel. At step 314 value $E_t$ may be compared to another threshold value to produce amplitude drop value $F_t$. Thus, decoders can be notified (using $F_t$) to ignore or otherwise perform special processing on the incoming signal.

Figure 2A:
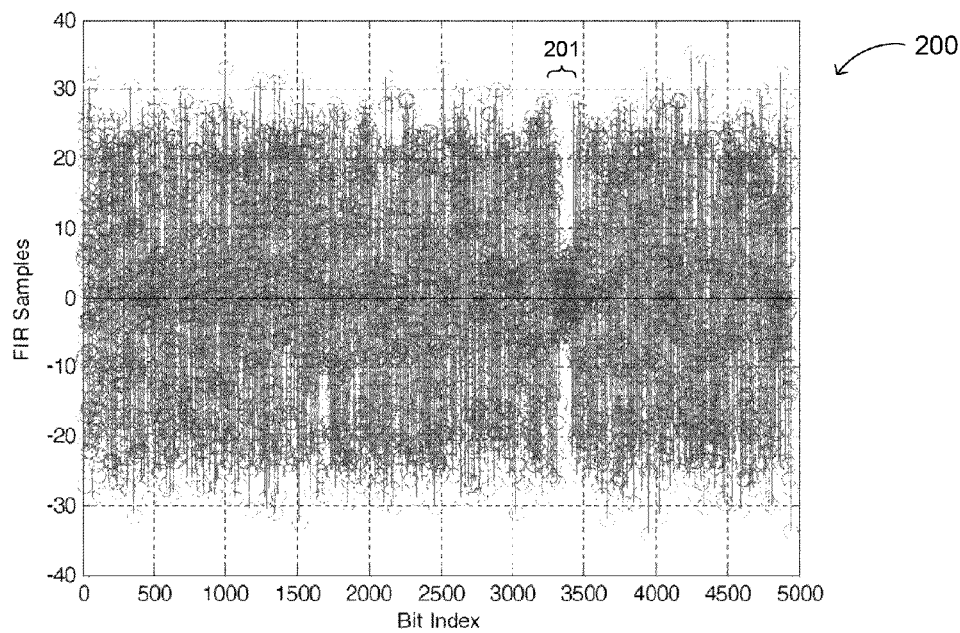
FIGS. 2A-G are graphs showing an incoming signal and the response of a conventional signal decoder to that signal.
Figure 2B:
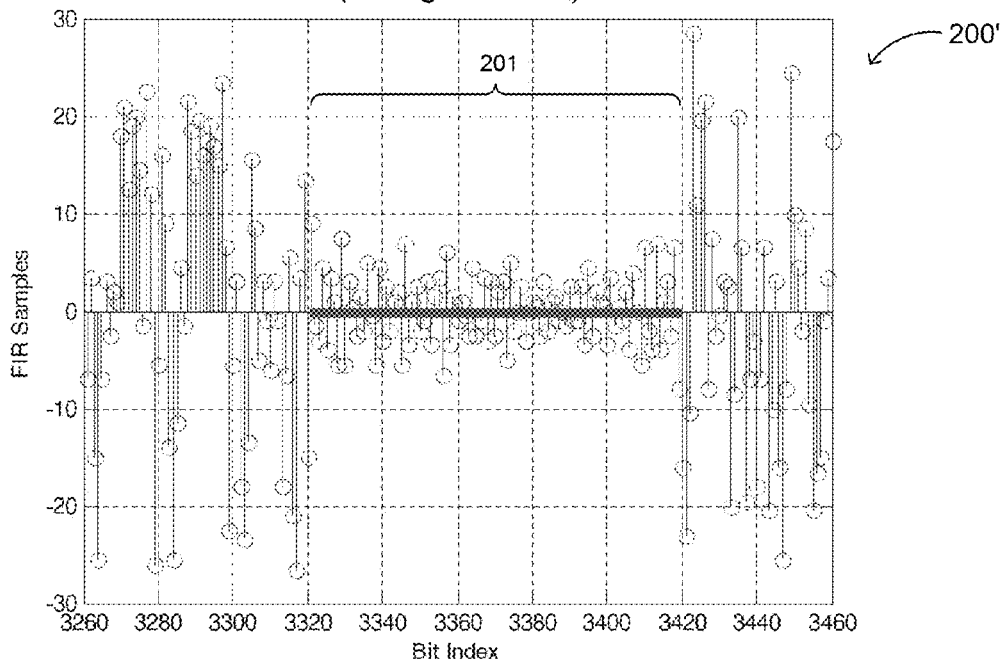
Figure 2C:
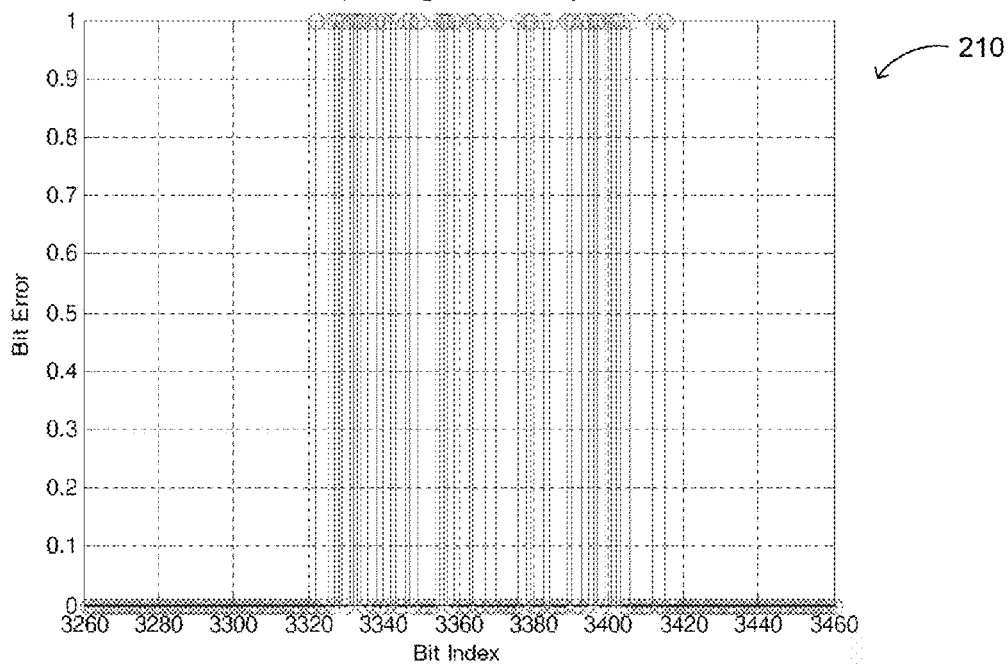
Figure 2D:
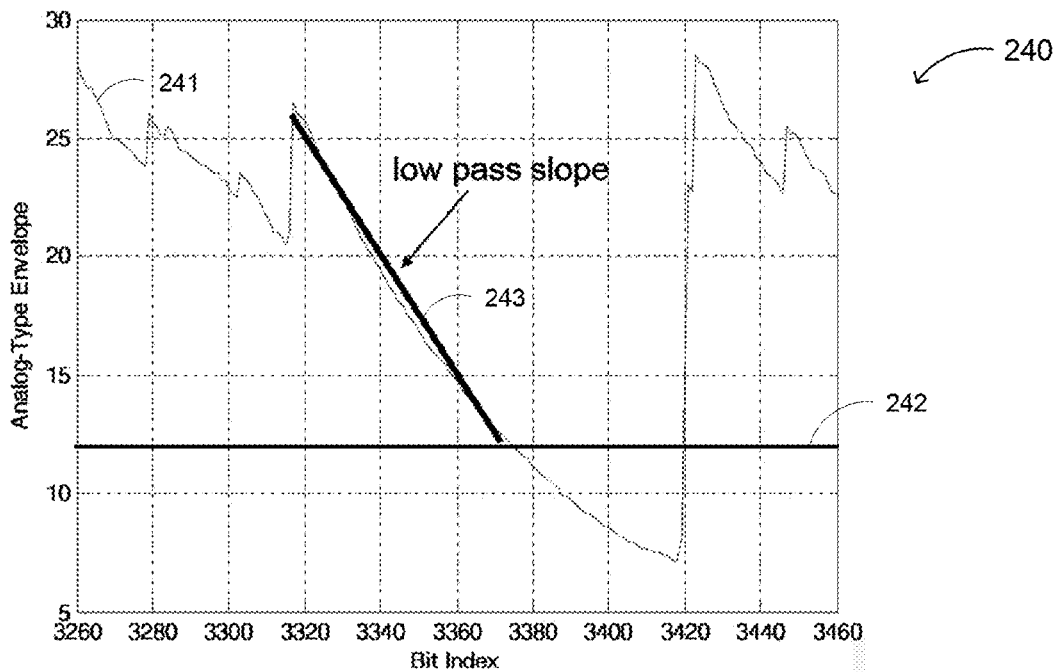
Figure 2E:
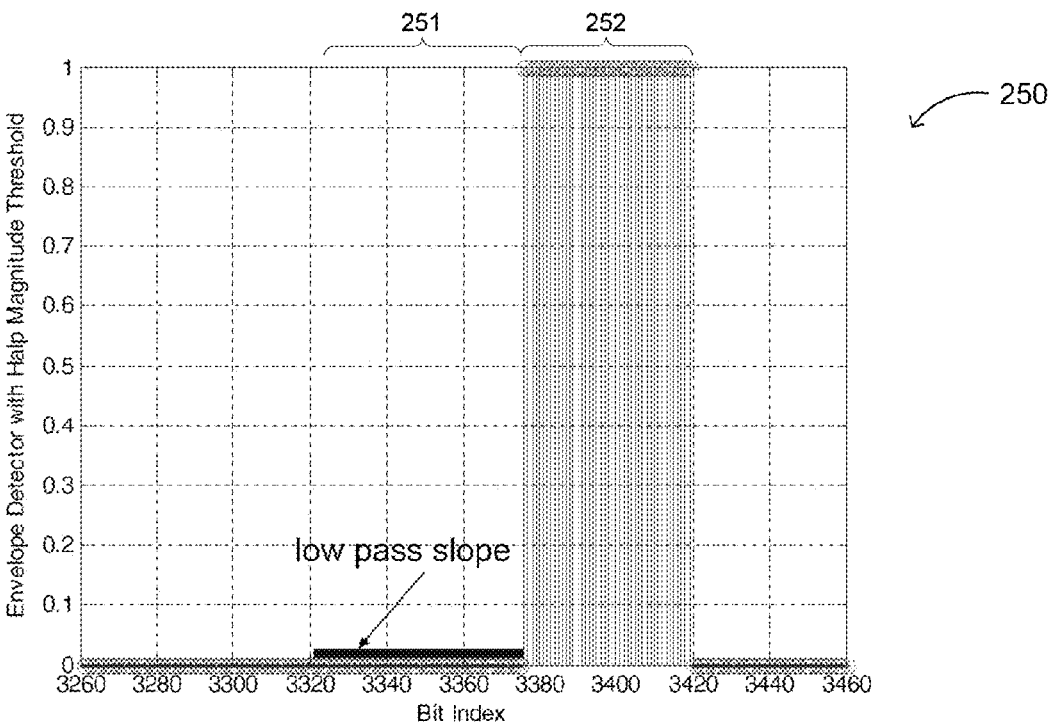
Figure 2F:
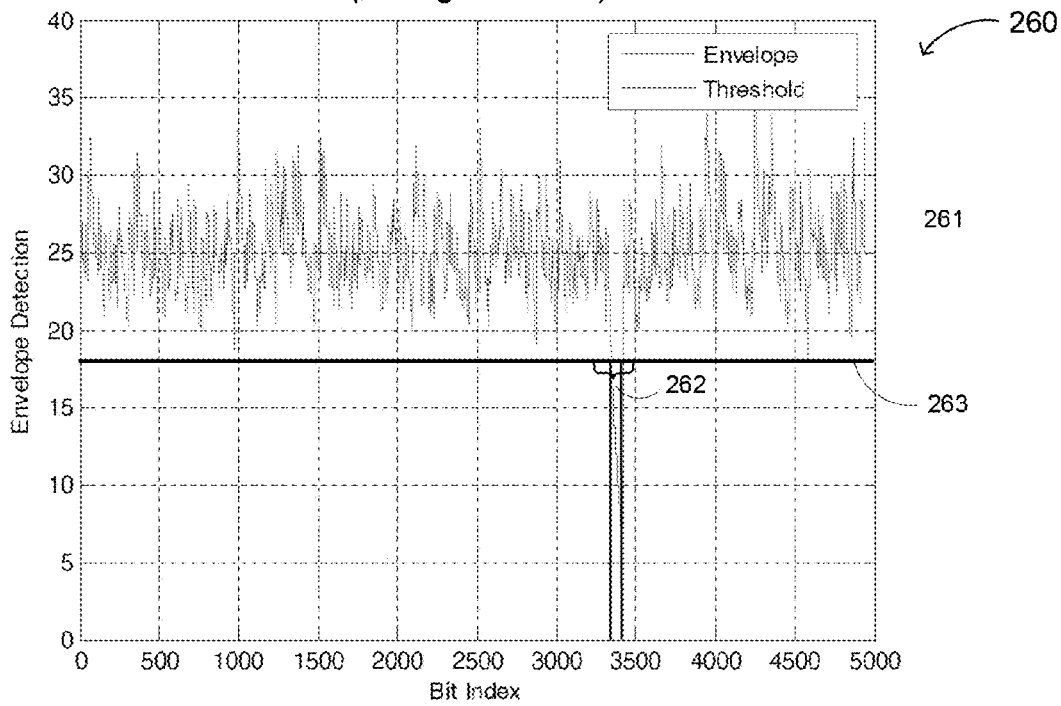
Figure 2G:
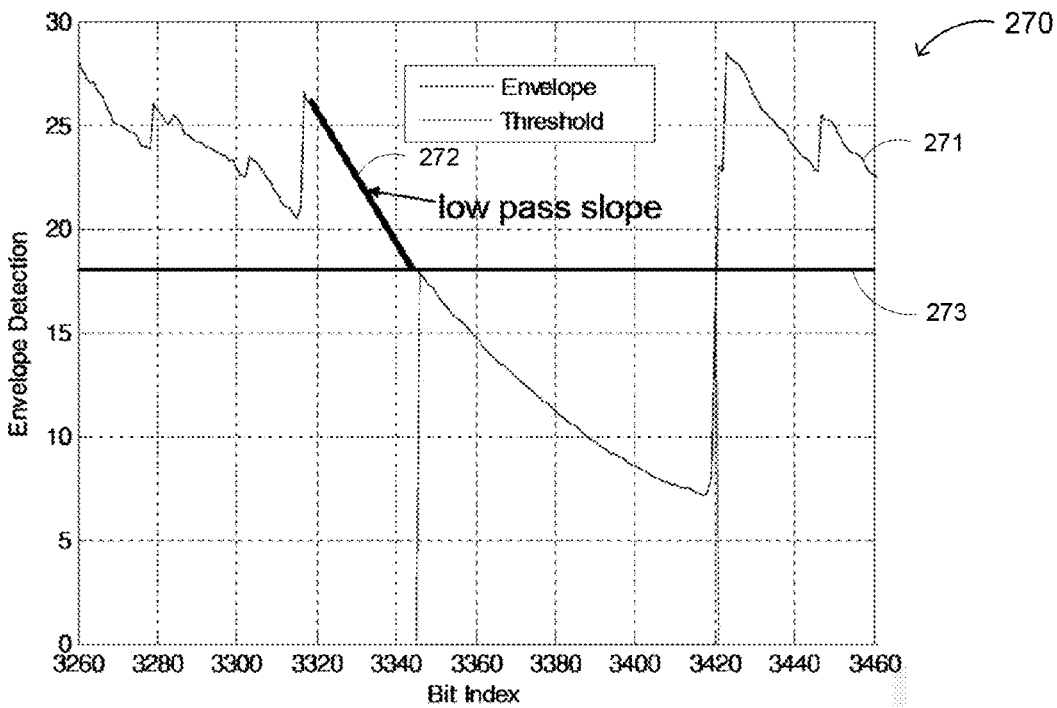
Figure 4:
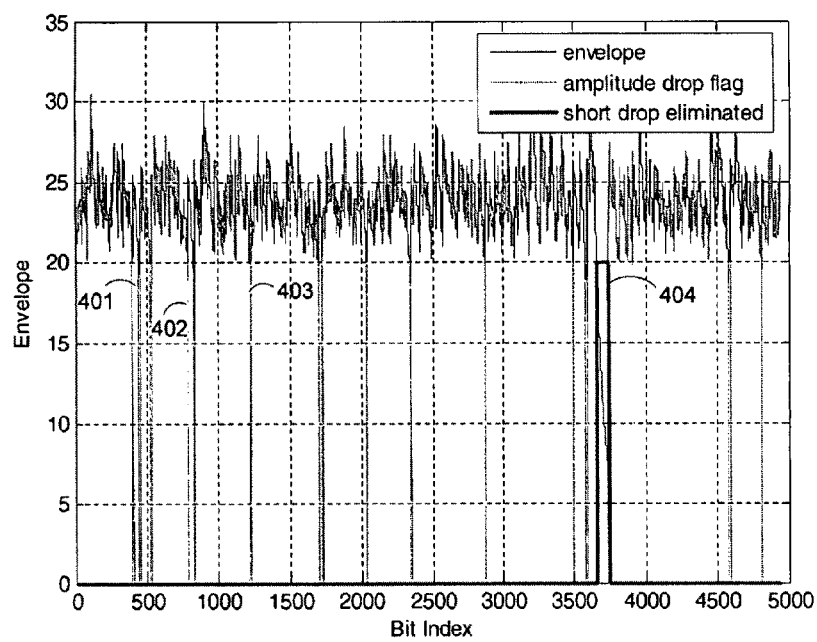
FIG. 4 is graph showing the response of an amplitude drop detector according to an embodiment of the present invention.

FIG. 4 shows exemplary output of the method of FIG. 3B. The envelope shown in FIG. 4 corresponds to an input signal as shown in FIG. 2A. Reference numerals 401, 402, and 403 indicate locations where the envelope drops below the first threshold, such that drop flag $D_t$ would be set at each of those points. However, at each of these locations $D_t$ is set for less than three (3) bit periods. Therefore the number of consecutive drop flags $E_t$ does not exceed four (4) at locations 401, 402, and 403. Therefore, if the threshold number of sequential drop flags is four (4), then amplitude drop value $F_t$ does not indicate an amplitude drop at these locations. Reference number 404, however, indicates the location where the drop flag is set for approximately 100 bit periods. Amplitude drop value $F_t$ is then set to represent an amplitude drop with short drops eliminated. Thus, even though the aggressive envelope threshold indicates multiple short drops, the method according to the present invention allows for those short drops to be eliminated.

In some implementations, it may be desirable to operate the amplitude detection method at a speed that is less than the incoming data rate. Thus, in one embodiment, the comparing step comprises selecting a subset of the sample values and comparing the highest sample in the subset to the threshold value. In a further embodiment, the selecting step comprises selecting a plurality of sequential sample values. In one implementation, the selecting step may comprise selecting four sequential sample values. For example, if the size of the subset is four (4), the highest of every four values may be compared to the threshold value. Therefore, the comparison operations may be conducted at a speed that is 25% (¼) of the data rate. Furthermore, by taking the maximum value of each subset of sample values, some transient amplitude drops may be smoothed out automatically.

Figure 5A:
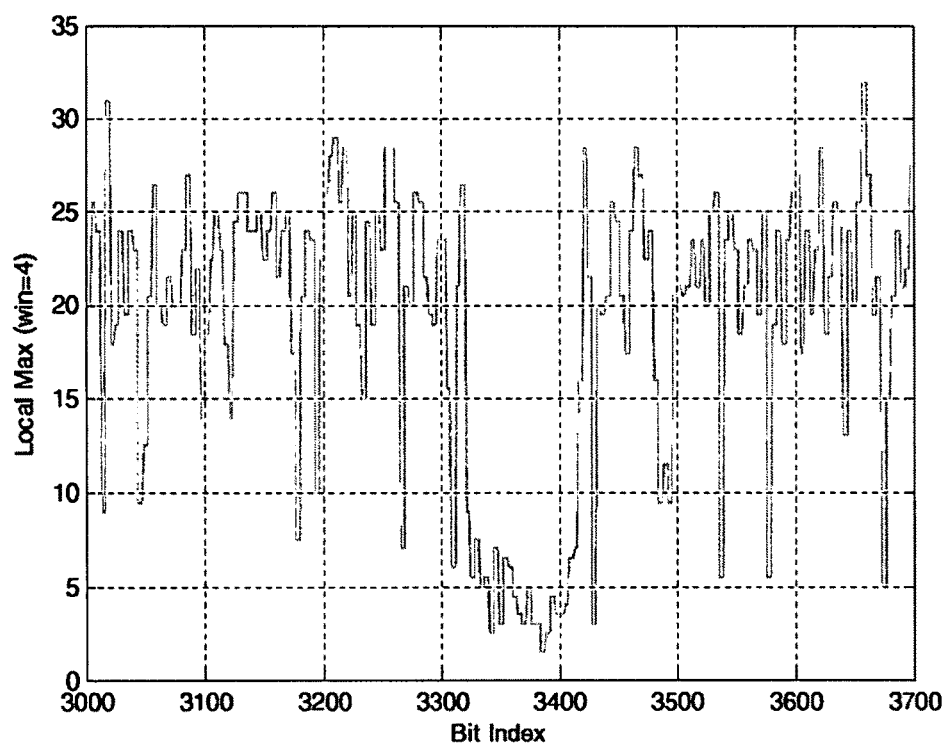
FIGS. 5A-C are graphs showing the envelope of an incoming signal.
Figure 5B:
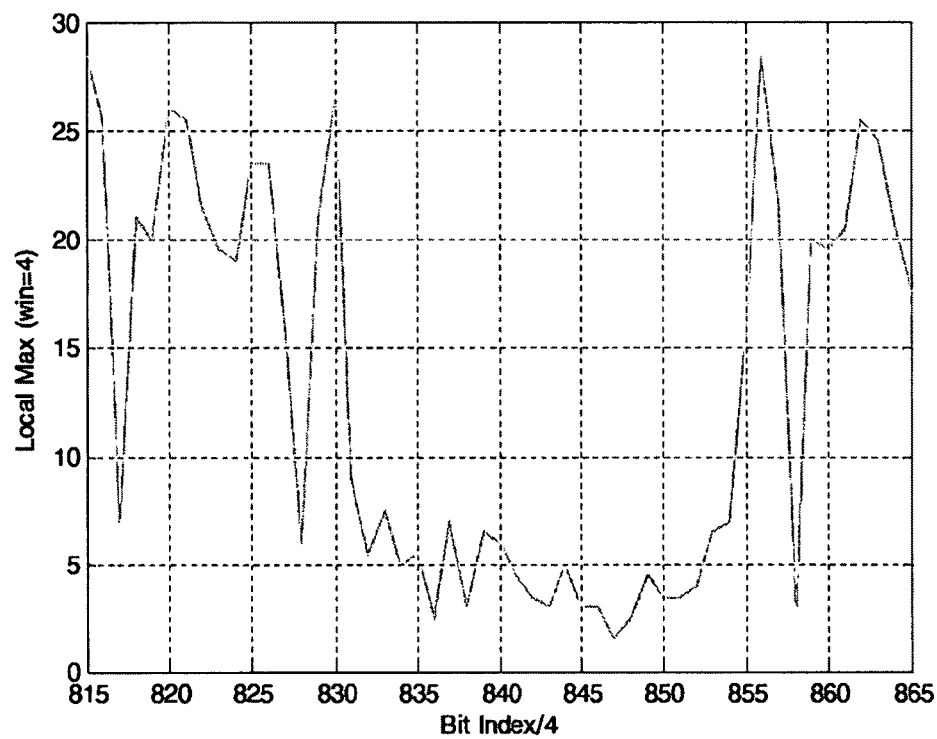
Figure 5C:
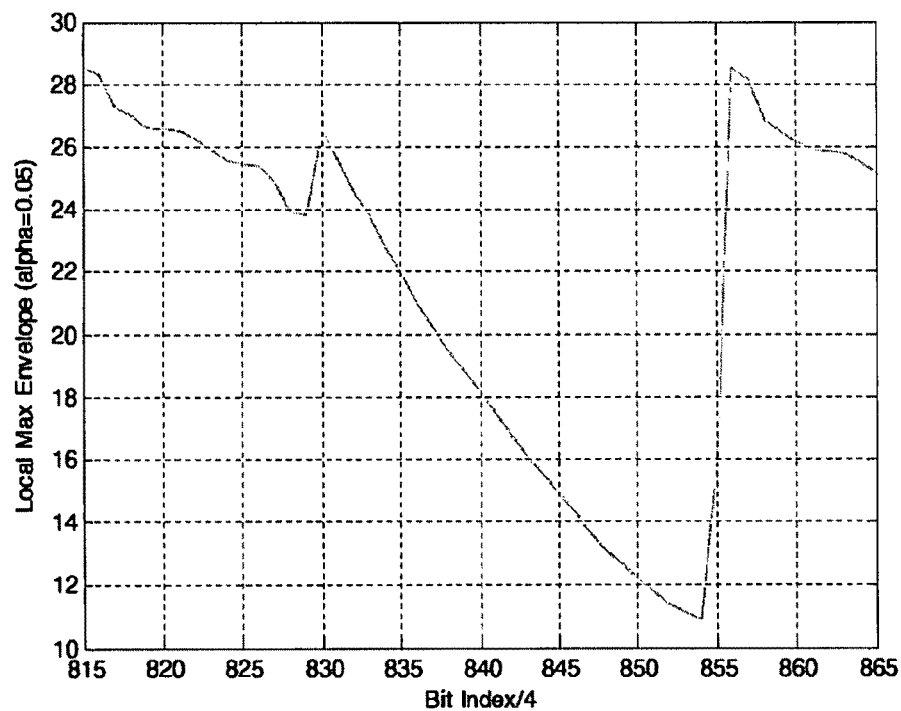

Referring now to FIG. 5A, the local maximum sample values for each consecutive subset of four bits is shown, where the sample value is an absolute value of the signal. The samples shown in FIG. 5A correspond to the incoming signal of FIG. 2A, and show an amplitude drop from approximately bit index 3300 to bit index 3400. FIG. 5B shows an expanded view of the same data, indexed to each subset of four bits (e.g., bit index/4), and showing the same amplitude drop region as FIG. 5A. FIG. 4 shows the same region of the signal as FIG. 5B, except that the sample value is an envelope value of the signal at each bit index.

In some implementations, the alternative embodiments above may be combined such that both the step of producing a plurality of drop flags includes comparing at least one of the sample values to a first threshold and setting one of the drop flags to a first state when the sample value is below the first threshold, and the detecting step includes selecting a subset of the drop flags. Alternatively or additionally, one may determine that the amplitude drop has occurred when the number of drop flags in the subset having the first state exceeds a second threshold.

The present method is particularly advantageous when combined with methods for decoding an incoming signal. Such decoding may involve an iterative decoder. As described above, decoding generally comprises decoding a most likely sequence of values, and then determining which of the most likely sequence of values is the correct one base on the probabilities of each sequence. Thus, the accuracy of the decoder depends on the correctness of the previously decoded bits. When the amplitude of an incoming channel drops, it is an indication that the channel no longer contains a valid signal (e.g., the channel is mostly or entirely noise). Therefore, any bits decoded in that section of the bitstream are not valid data, and use of that data will corrupt further operation of the decoding method. By detecting amplitude drops before decoding, this corruption of later-decoded bits can be avoided.

Therefore, in a further embodiment of the present invention, the method comprises producing an amplitude drop signal in response to the amplitude drop detection method described above, and decoding the incoming signal in response to the amplitude drop signal. In a further embodiment, the method further comprises Viterbi detection of the signal. In one implementation of the present invention, the Viterbi detection may comprise performing a Soft Output Viterbi Algorithm (SOVA) to produce probabilities for each likely bit sequence.

An Exemplary Circuit and/or Architecture

The invention further relates to circuits for detecting an amplitude drop in an incoming signal, in accordance with the methods described above. In one embodiment, the circuit generally comprises a sampling circuit configured to produce a sample signal in response to the incoming signal, a threshold circuit configured to receive the sample signal and to produce a drop flag signal in response to the sample signal, and a drop detection circuit configured to produce an amplitude drop signal in response to at least two values of the drop flag signal. The circuit may be implemented entirely on a monolithic integrated circuit die, or the functions may be distributed among multiple interconnected integrated circuits. The integrated circuit(s) may include general purpose computing circuits (e.g., microprocessors) which may be configured with appropriate software and/or firmware to perform some or all of the calculations and/or transformations described herein. Thus, in another embodiment an apparatus for detecting an amplitude drop in an incoming signal may comprise means for sampling an incoming signal to produce a sample signal, means for comparing the sample signal to a threshold value to produce a drop flag, and means for detecting an amplitude drop signal in response to at least two values of the drop flag signal.

Figure 6A:
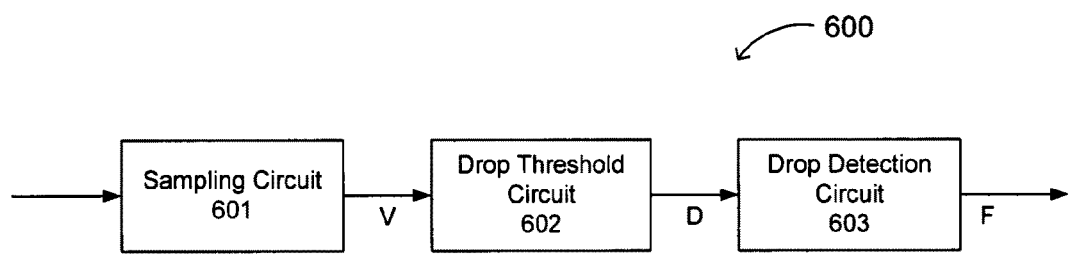
FIGS. 6A-C are diagrams showing exemplary circuits for amplitude drop detection according to embodiments of the present invention.

Referring now to FIG. 6A, an exemplary circuit is shown. Sampling circuit 601 is generally configured to receive an incoming signal from a channel, and to produce sample signal V. Drop threshold circuit 602 is generally configured to receive sample signal V, and to produce drop flag signal D. Drop detection circuit 603 may be configured to produce an amplitude drop signal F in response to at least two of the drop flag values.

In one embodiment, the sampling circuit may be configured to produce the sample signal in response to an envelope of the incoming signal. Thus, referring again to FIG. 6A, sample signal V may comprise envelope values (e.g., envelope values produced by the analog-like digital envelope detector described above). Alternatively, sample signal V may comprise absolute value samples of the incoming signal, or any other representation of the incoming signal.

Drop flag signal D generally comprises a sequence of binary drop values, corresponding to the sequence of sample values represented by sample signal V. Drop threshold circuit 602 may compare the sample values to produce the drop flag values. For example, when the sample value is less than a threshold value, the corresponding drop flag may be set to a binary "1". Otherwise, the drop flag may be set to a binary "0". These values are arbitrary and may be switched, or each value may be represented by more than one bit.

In one embodiment, the drop detection circuit is further configured to select a subset of drop flags derived from the drop flag signal, to compare the number of drop flags in the subset having a first state to a threshold value, and to produce the amplitude drop signal in response to the comparison. In a further embodiment, the drop detection circuit is further configured to select at least two sequential drop flags. In one implementation, the drop detection circuit may be configured to select four (4) sequential drop flags. In a further embodiment, the drop detection circuit is further configured to calculate a moving average of the subset of drop flags.

Referring again to FIG. 6A, drop detection circuit 603 may accumulate four sequential values of the drop flag signal. When all four values indicate a drop (e.g., four consecutive values of sample signal V are below the given threshold) the value of F corresponding to the first of those four sample values may be set to indicate that a "long" drop (e.g., a drop of at least four samples duration) has occurred.

In some implementations, it may be desirable to operate the threshold and detection circuits at a speed that is less than the incoming data rate. Thus, in one embodiment the threshold circuit is further configured to select a subset of sample values derived from the sample signal and to compare the highest of the sample value in the subset to the threshold value. In still a further embodiment the threshold circuit is further configured to select a plurality of sequential sample values. In another embodiment, the threshold circuit is further configured to select four sequential sample values. For example, if the size of the subset is four (4), the highest of every four values may be compared to the threshold value. Therefore, the threshold operations may be conducted at a speed that is 25% (¼) of the data rate. Furthermore, by taking the maximum value of each subset of sample values, some transient amplitude drops may be smoothed out automatically.

Figure 6B:
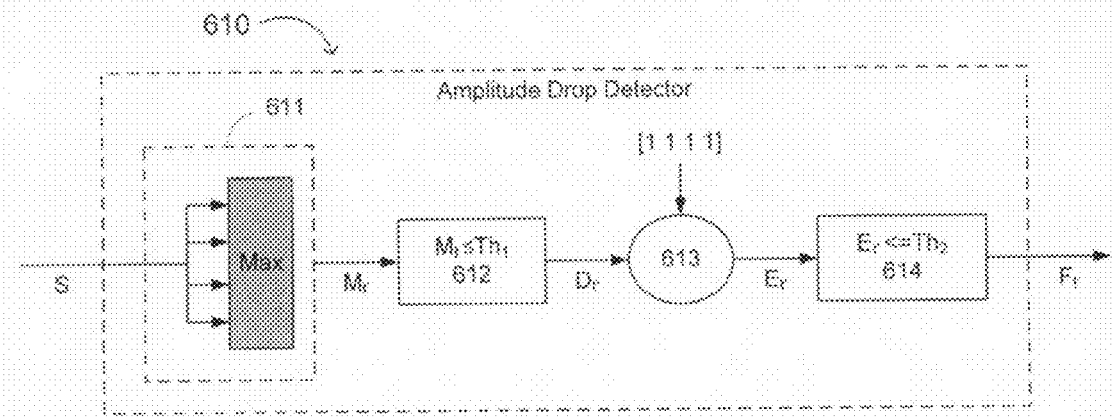

Referring now to FIG. 6B, amplitude drop detector circuit 610 is shown. Local maximum circuit 611 may be configured to receive four (4) sequential samples $S_{t-3}$ to $S_t$ of the incoming signal. Local maximum circuit 611 may be further configured to select the highest (maximum) of the four samples, to produce $M_{t'}$. Drop threshold circuit 612, accumulator circuit 613, and drop detection circuit 614 may be configured to operate only after local maximum circuit 611 has received four new samples (e.g., on a clock that is $\frac{1}{4}^{th}$ the speed of the data clock). Thus t' in $M_{t'}$, $D_{t'}$, $E_{t'}$, and $F_{t'}$ corresponds to a time index of this slower clock (e.g., slower time index t' may corresponds to faster time index t/4.

In one implementation, the above concepts may be combined such that the threshold circuit comprises a comparison circuit configured to compare at least one sample value derived from the sample signal to a threshold value, and the threshold circuit is further configured to produce the drop flag signal in response to an output of the comparison circuit. Alternatively or additionally, the drop detection circuit may be further configured to select a subset of drop flags derived from the drop flag signal, to compare the number of drop flags in the subset having a first state to a threshold value, and to produce the amplitude drop signal in response to the comparison.

Thus, referring again to FIG. 6B, drop threshold circuit 612 may compare the local maximum value $M_{t'}$ to a threshold value $Th_1$, and drop flag $D_{t'}$ may be set accordingly. Accumulator 613 may accumulate a subset of drop flags (e.g., drop flags $D_{t'-n}$ through $D_{t'}$, where n is an integer of at least 1). In one embodiment, accumulator 613 may accumulate a number of consecutive positive drop flags (e.g., the number of consecutive values of $D_{t'}$ that indicate that the envelope has fallen below the threshold value) to produce value $E_{t'}$. Drop detection circuit 614 may compare $E_{t'}$ to a second threshold number of consecutive drop flags $Th_2$ to produce amplitude drop value $F_{t'}$. Thus, decoding circuits can be notified (using $F_{t'}$) to ignore the incoming signal. In one exemplary embodiment, the threshold number of sequential drop flags $Th_2$ is four (4), but those skilled in the art may choose any threshold value depending on the characteristics of the channel.

Figure 7A:
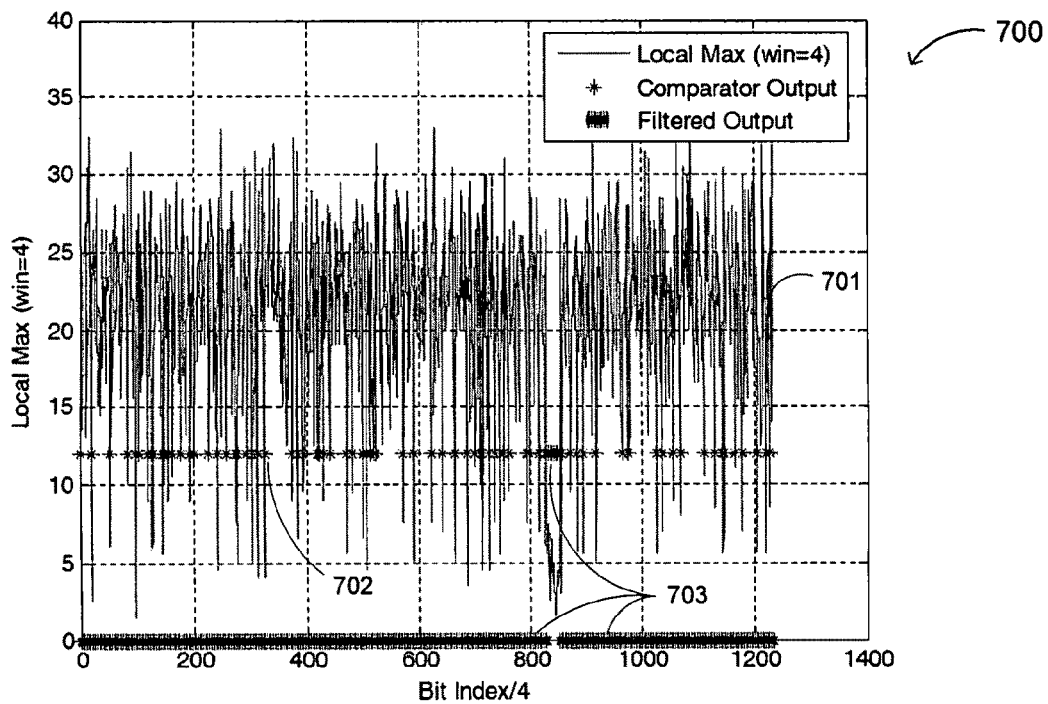
FIGS. 7A-B are graphs showing the response of an amplitude drop detector according to embodiments of the present invention.
Figure 7B:
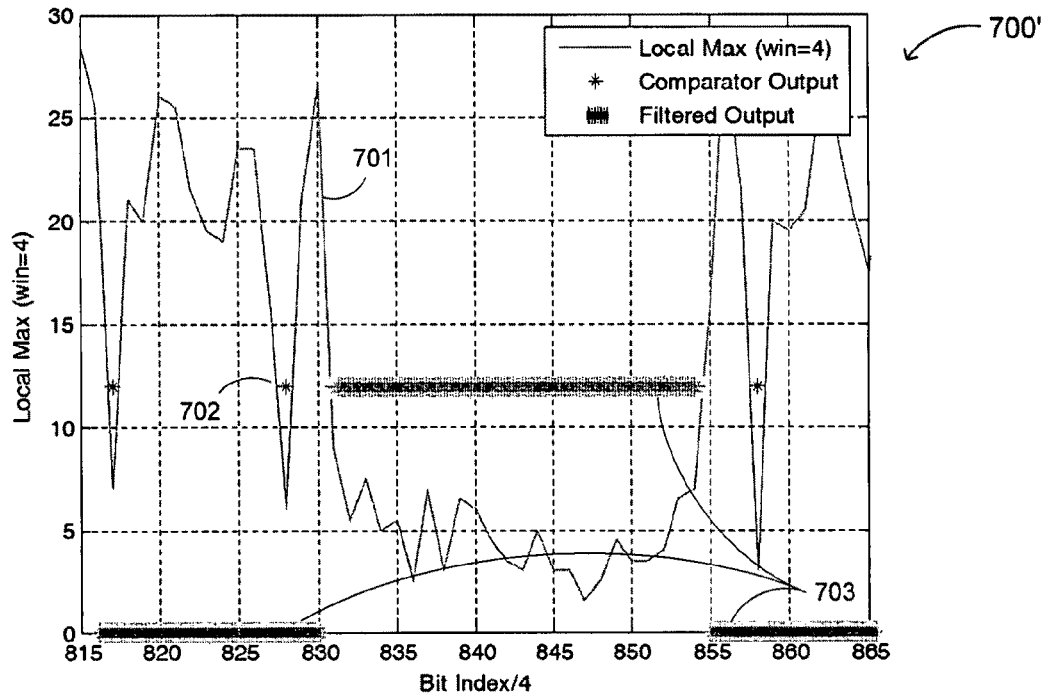

Referring now to FIGS. 7A and 7B, graphs 700 and 700' show exemplary outputs of drop threshold circuit 612 and drop detection circuit 614. Graphs 700 and 700' show the same envelope and outputs at different time-scale resolutions. Comparator output symbols, such as those at reference numeral 702, represent the output of threshold circuit 612, where the drop flag may be set whenever envelope 701 falls below the first threshold. The filtered output symbols, such as those at reference numeral 703, represent the output of drop detection circuit 614, such that short or transient amplitude drops do not trigger amplitude drop signal F.

The present circuit for detecting amplitude drops is particularly advantageous when combined with a decoding circuit. As described herein, such a combination allows a decoding circuit to ignore portions of a signal that contain substantially only noise. Thus, in another embodiment the invention relates to a signal processor comprising the amplitude drop correction circuit described herein and a decoding circuit configured to decode the incoming signal in response to the amplitude drop signal. In a further embodiment, the circuit further comprises a Viterbi detector configured to decode the incoming signal. In one implementation of the present invention, the Viterbi detector may also perform a Soft Output Viterbi Algorithm (SOVA) to produce probabilities for each likely bit sequence.

Figure 6C:
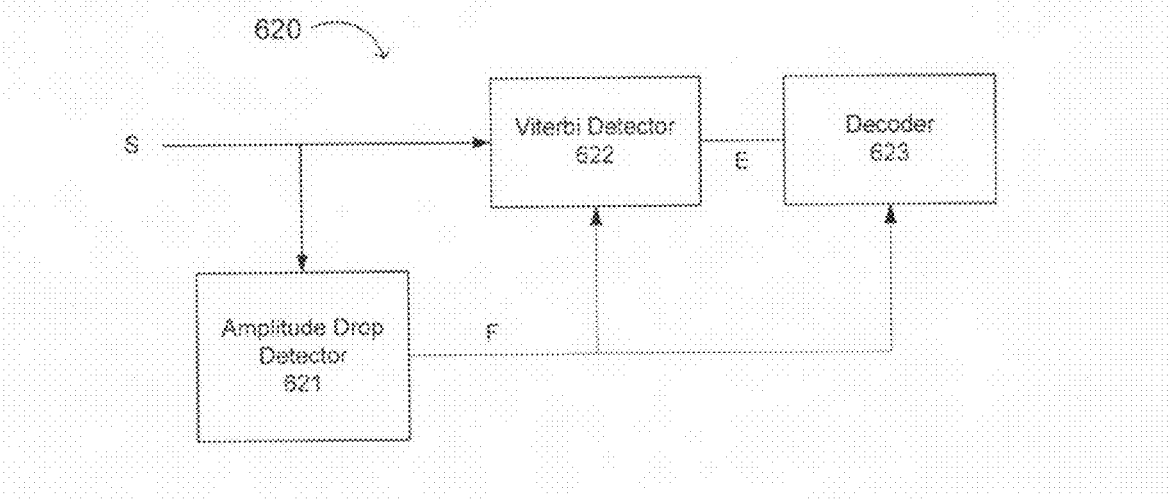

Referring now to FIG. 6C, signal decoder 620 is shown. Amplitude drop detector 621 and Viterbi detector 622 may receive incoming signal S. Amplitude drop detector 621 may comprise amplitude drop detection circuit 600 or 610, or any circuit or combination of circuits corresponding to the inventive concepts presented herein. Viterbi detector 622 may comprise one or more buffers to delay processing of the incoming signals until the amplitude drop detector has determined whether or not an amplitude drop has occurred. Viterbi detector 622 generally produces one or more most likely bit sequences corresponding to incoming signal S. Decoder 623 generally receives the one or more most likely bit sequences from Viterbi detector 622 to produce the received data stream. Both Viterbi detector 622 and decoder 623 may be configured to receive signal F from amplitude drop detector 621 to suspend processing of the incoming signal when an amplitude drop is detected and/or to restart processing of the incoming signal when an amplitude drop event ends.

Comparative Results

Figure 8A:
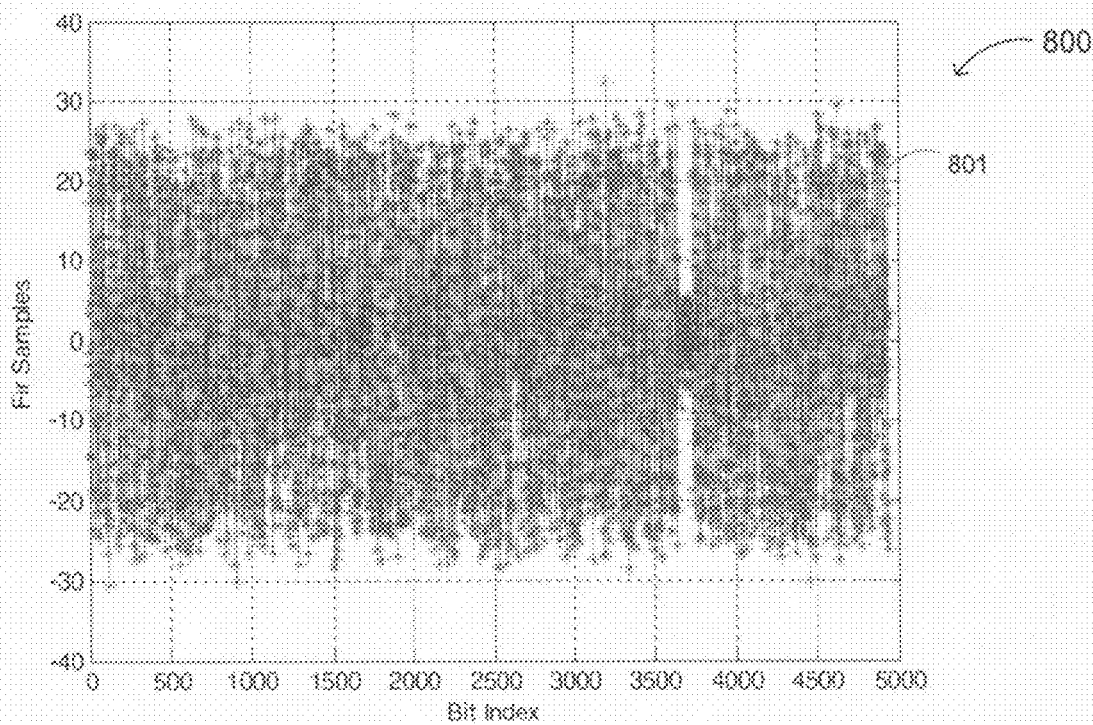
FIGS. 8A-8F are graphs comparing the response of alternative amplitude drop detectors.
Figure 8B:
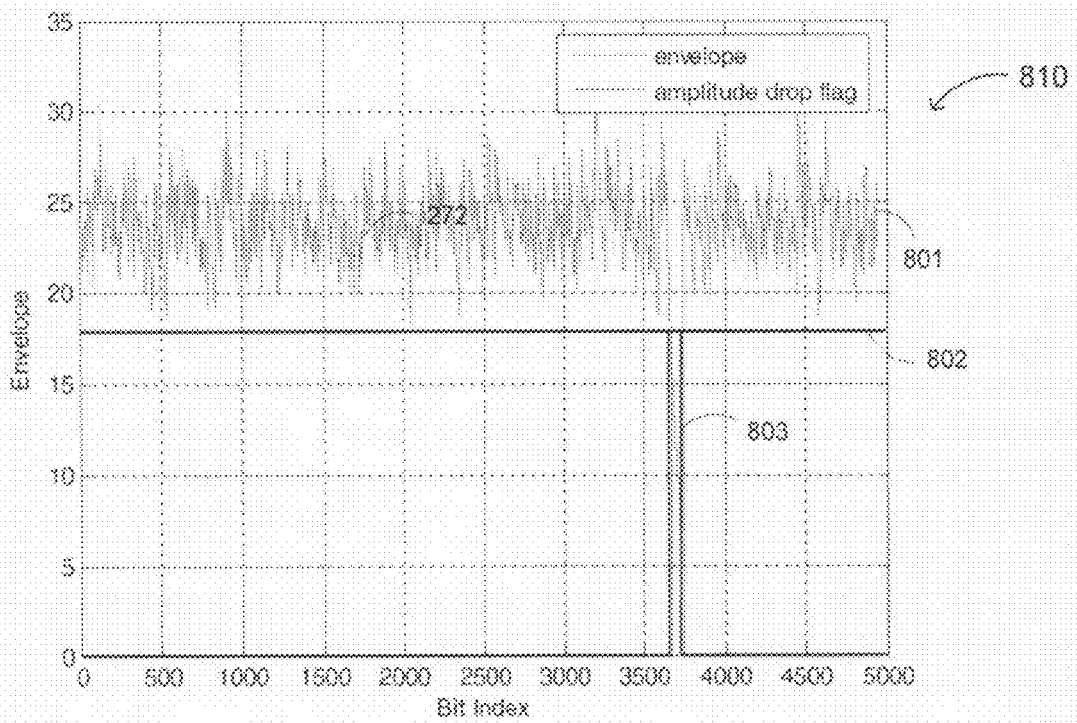
Figure 8C:
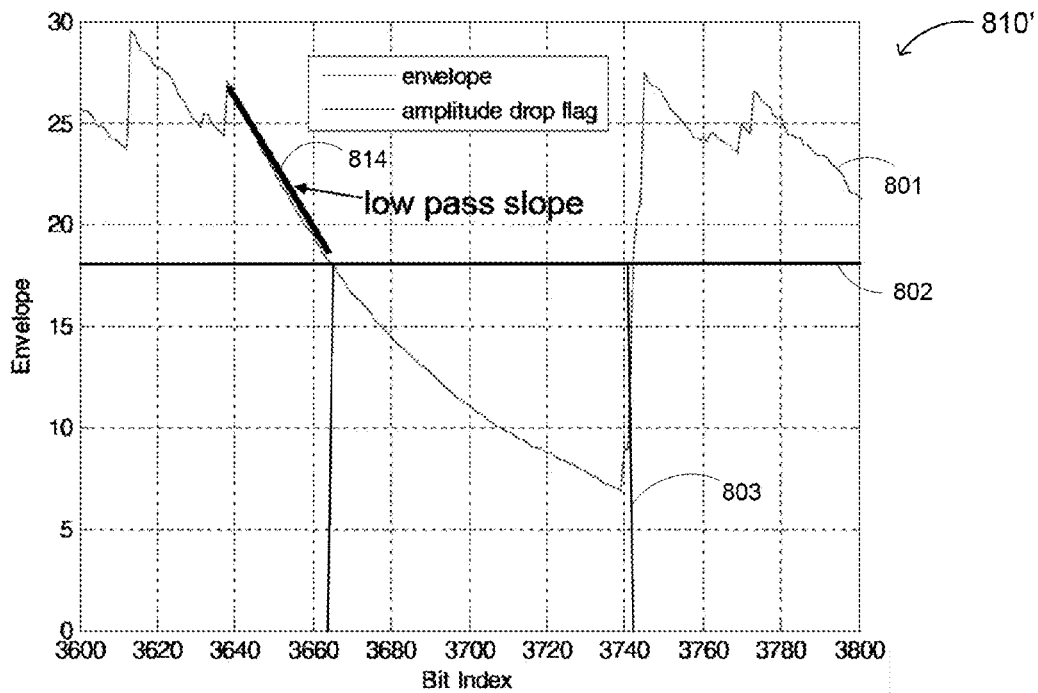

Referring now to FIG. 8A, another exemplary input waveform 801 is shown. In FIGS. 8B-F, the responses of various embodiments of the present invention to the waveform 801 are shown. Referring now to FIGS. 8B and 8C, graphs 810 and 810' show a drop flag 803 (e.g., a drop flag produced by threshold circuit 602) in response to an envelope 801. Graphs 810 and 810' show essentially the same features at different time scales. Threshold 802 is set to a nominal value of 18 with respect to the envelope levels. As shown by low pass slope 814, this threshold level leaves a significant portion of the amplitude drop undetected.

Figure 8D:
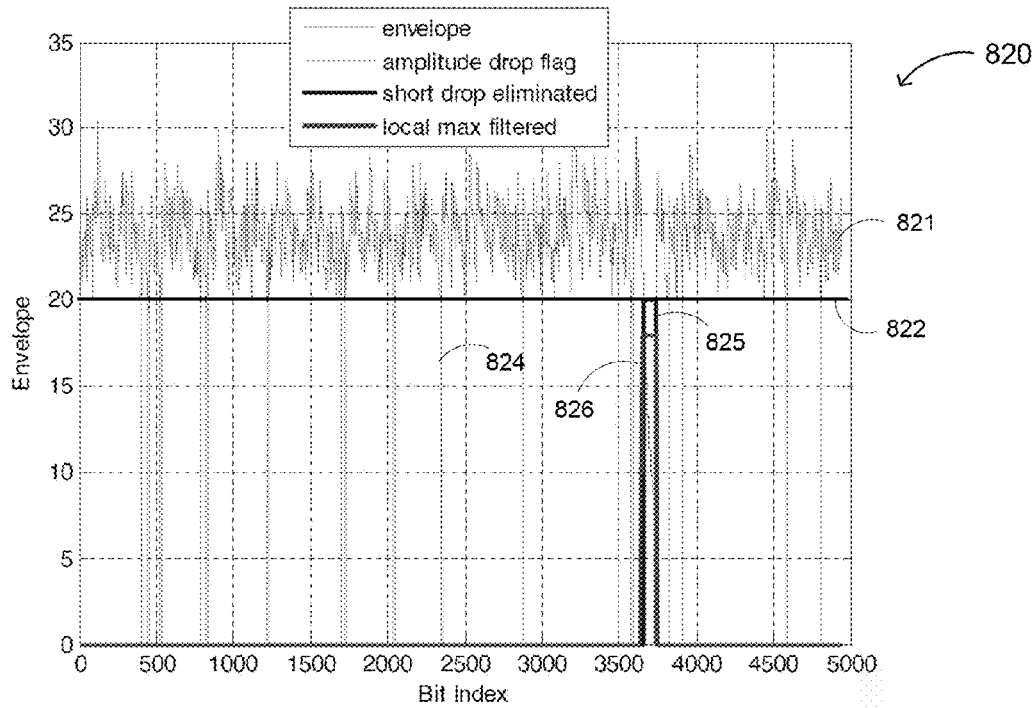
Figure 8E:
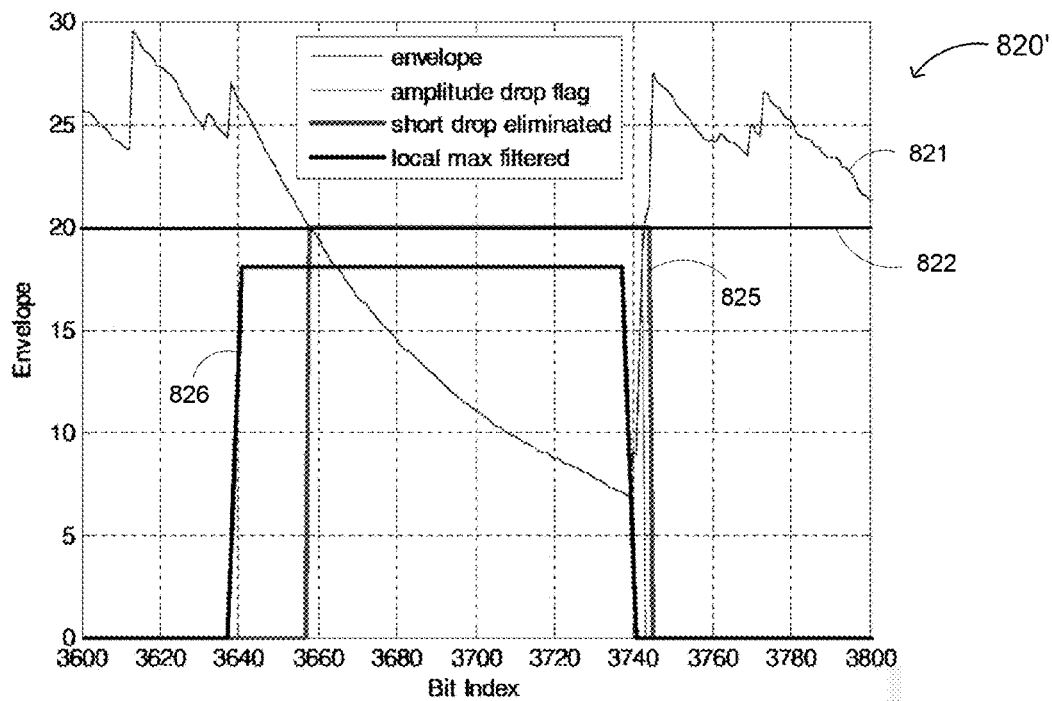
Figure 8F:
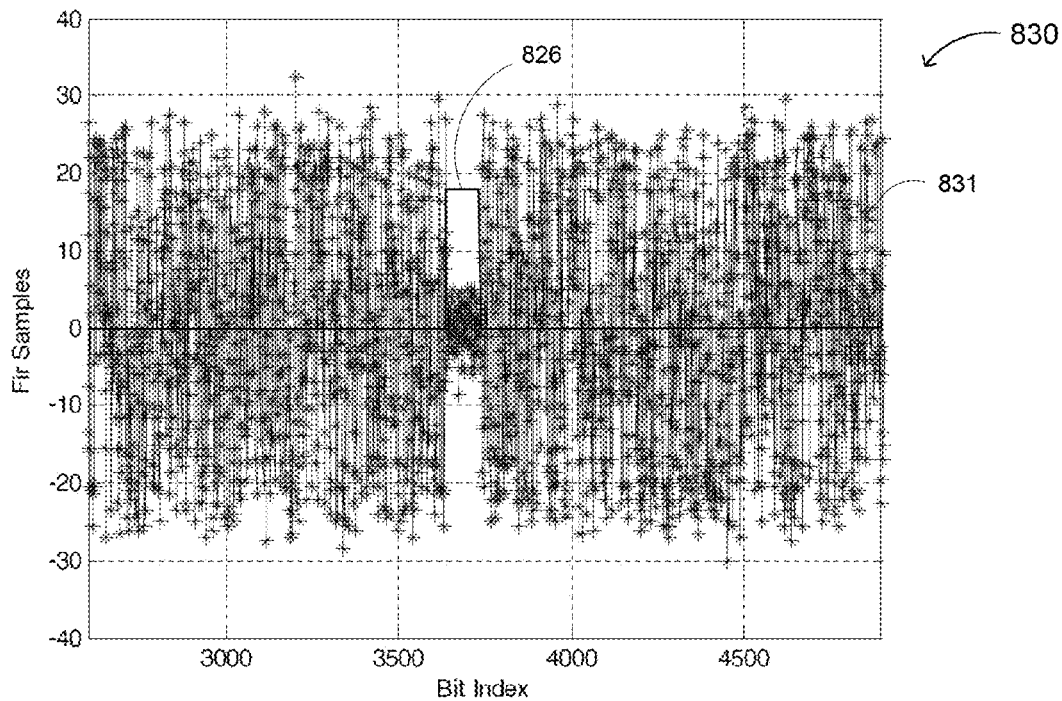

Referring now to FIGS. 8D and 8E, graphs 820 and 820' show the same envelope 821 as shown in graphs 820 and 820', this time with threshold 822 set to a nominal value of 20 with respect to the envelope levels. At this threshold level, it can be seen that drop flag 824 (e.g., a drop flag produced by threshold circuit 602) is raised at many points where the amplitude transiently drops beneath the higher threshold 822. Flag 825 shows the results of filtering out short drops (e.g., using the drop detection circuit 603). Flag 826 shows the results of both filtering out short drops, and selecting the local maximum of a subset of sequential envelope values (e.g., using amplitude drop detection circuit 620). Thus, it can be seen that using the inventive concepts presented herein, the threshold can be raised while eliminating false drop flags due to transient amplitude drops. Finally, referring to FIG. 8F, graph 830 shows amplitude drop flag 826 (e.g., the output of drop detection circuit 620) superimposed on input waveform 831, demonstrating that substantially all of the amplitude drop can be detected using these inventive concepts.

The System and Network

In a further aspect, the invention relates to a transceiver comprising a circuit for detecting an amplitude drop in an incoming signal as described herein (e.g., an amplitude drop detector coupled to a signal decoder), a transmitter configured to transmit serial data to a network, and a receiver communicatively coupled to the circuit, configured to receive serial data from the network (e.g., using the amplitude drop detector circuit and a decoder to decode the data). The components of the transceiver may be embodied on a single integrated circuit, or the functions may be distributed among multiple interconnected integrated circuits. The integrated circuit(s) may include general purpose computing circuits (e.g., microprocessors) which may be configured with appropriate software and/or firmware to perform some or all of the calculations and/or transformations described herein.

In another embodiment, the invention relates to a system (e.g. a device comprising one or more integrated circuit chips, packaging for such chips, circuit boards including such packaged chips, and/or housing enclosing such circuit boards) for transferring data on or across a network, including the transceiver, at least one transmitter port communicatively coupled to the transmitter for transmitting serial data to an external receiver, and at least one receiver port communicatively coupled to the receiver for receiving the data stream.

A further aspect of the invention concerns a network, comprising a plurality of systems including the circuit for detecting an amplitude drop in an incoming signal, communicatively coupled to each other; and a plurality of storage or communications devices, wherein each storage or communications device is communicatively coupled to one of the systems. The network may be any kind of known network, such as those communicating via a standard storage bus (e.g., PCIe and SATA), a storage network (e.g., RAID array), Ethernet, or wireless network. The network may include any known storage or communications device.

Figure 9A:
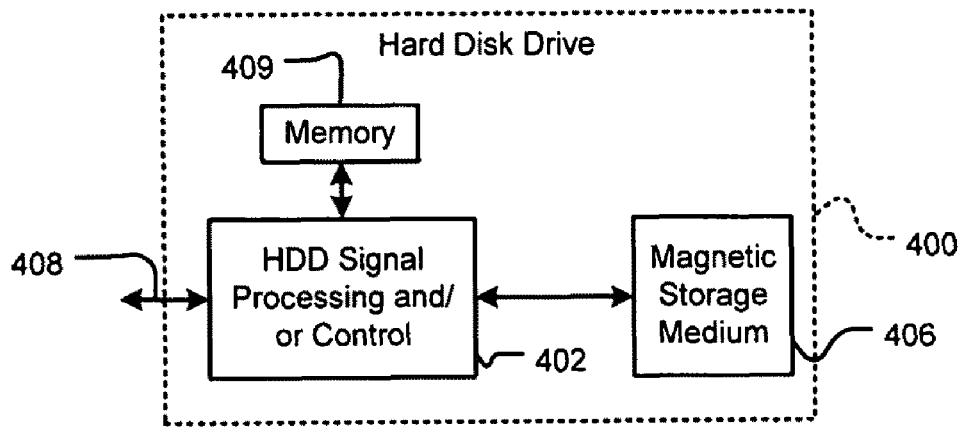
FIG. 9A is a diagram of an exemplary hard disk drive.

Various exemplary implementations of the present invention are shown in FIGS. 9A-9G. Referring now to FIG. 9A, the present invention can be implemented in a hard disk drive (HDD) 400. The present invention may implement signal processing circuits, which are generally identified in FIG. 9A at 402. In some implementations, the signal processing circuit 402 and/or other circuits (not shown) in the HDD 400 may process data, perform coding and/or encryption, perform calculations, and/or format data that is output to and/or received from a magnetic storage medium 406.

The HDD 400 may communicate with a host device (not shown) such as a computer, mobile computing devices such as personal digital assistants, cellular phones, media or MP3 players and the like, and/or other devices via one or more wired or wireless communication links 408. The HDD 400 may be connected to memory 409 such as random access memory (RAM), low latency nonvolatile memory such as flash memory, read only memory (ROM), and/or other suitable electronic data storage.

Figure 9B:
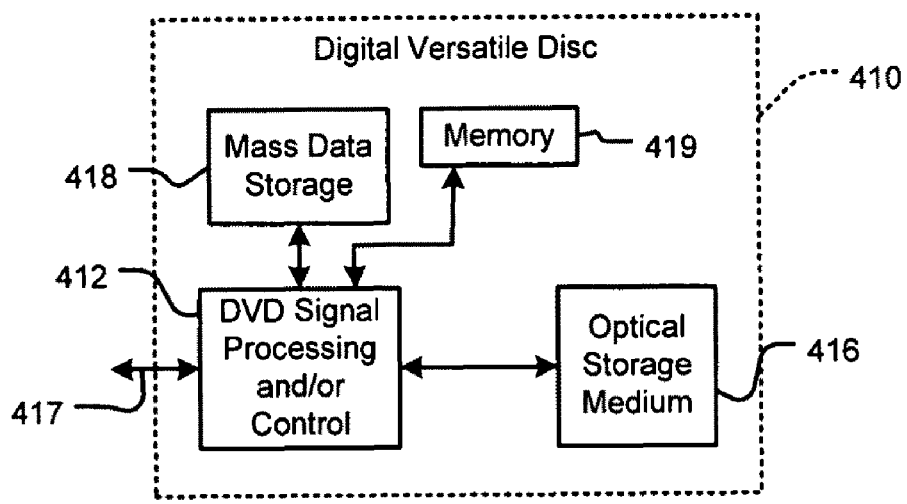
FIG. 9B is a diagram of an exemplary digital versatile disc (DVD) player.

Referring now to FIG. 9B, the present invention can be implemented in a digital versatile disc (DVD) drive 410. The present invention may implement signal processing circuits, which are generally identified in FIG. 9B at 412, and/or mass data storage of the DVD drive 410. The signal processing circuit 412 and/or other circuits (not shown) in the DVD 410 may process data, perform coding and/or encryption, perform calculations, and/or format data that is read from and/or data written to an optical storage medium 416. In some implementations, the signal processing circuit 412 and/or other circuits (not shown) in the DVD 410 can also perform other functions such as encoding and/or decoding and/or any other signal processing functions associated with a DVD drive.

The DVD drive 410 may communicate with an output device (not shown) such as a computer, television or other device via one or more wired or wireless communication links 417. The DVD 410 may communicate with mass data storage 418 that stores data in a nonvolatile manner. The mass data storage 418 may include a hard disk drive (HDD). The HDD may have the configuration shown in FIG. 9A. The HDD may be a mini HDD that includes one or more platters having a diameter that is smaller than approximately 1.8". The DVD 410 may be connected to memory 419 such as RAM, ROM, low latency nonvolatile memory such as flash memory and/or other suitable electronic data storage.

Figure 9C:
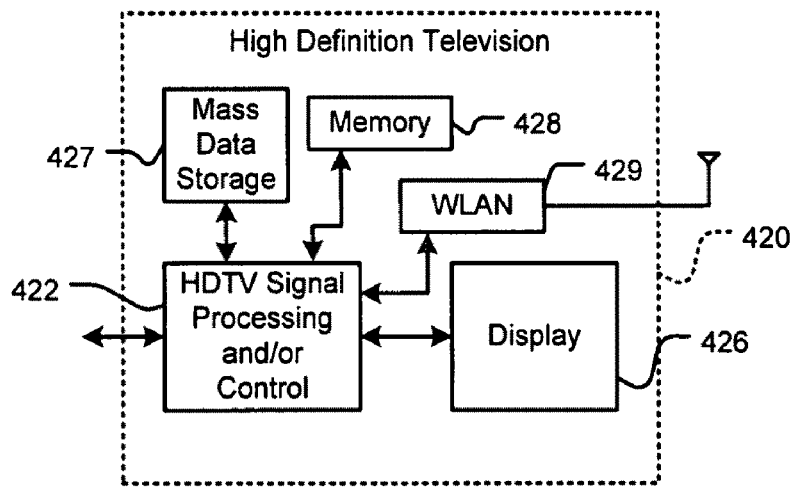
FIG. 9C is a diagram of an exemplary high definition television (HDTV).

Referring now to FIG. 9C, the present invention can be implemented in a high definition television (HDTV) 420. The present invention may implement signal processing circuits, which are generally identified in FIG. 9E at 422, a WLAN interface and/or mass data storage of the HDTV 420. The HDTV 420 receives HDTV input signals in either a wired or wireless format and generates HDTV output signals for a display 426. In some implementations, signal processing circuit 422 and/or other circuits (not shown) of the HDTV 420 may process data, perform coding and/or encryption, perform calculations, format data and/or perform any other type of HDTV processing that may be required.

The HDTV 420 may communicate with mass data storage 427 that stores data in a nonvolatile manner such as optical and/or magnetic storage devices. At least one HDD may have the configuration shown in FIG. 9A and/or at least one DVD may have the configuration shown in FIG. 9B. The HDD may be a mini HDD that includes one or more platters having a diameter that is smaller than approximately 1.8". The HDTV 420 may be connected to memory 428 such as RAM, ROM, low latency nonvolatile memory such as flash memory and/or other suitable electronic data storage. The HDTV 420 also may support connections with a WLAN via a WLAN network interface 429.

Figure 9D:
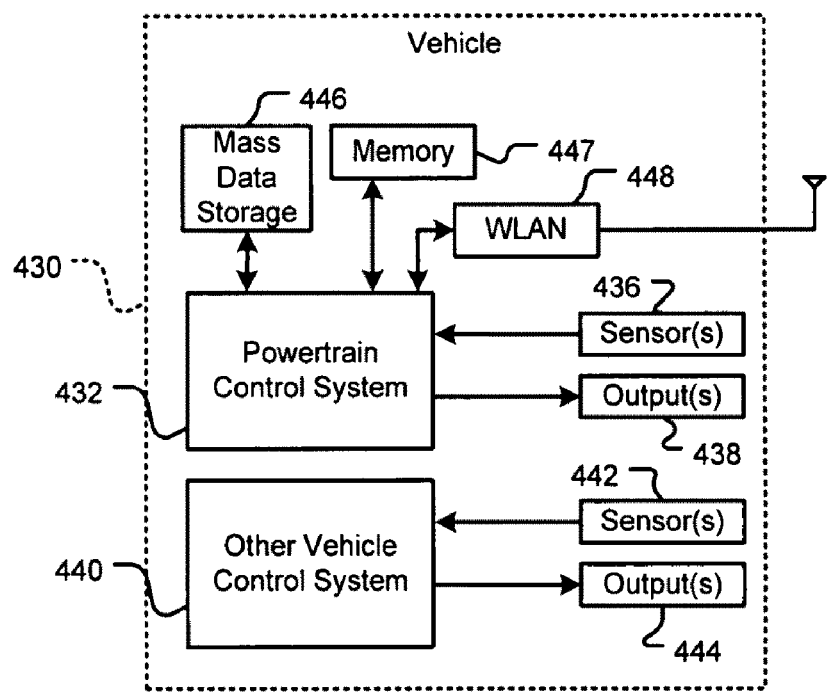
FIG. 9D is a diagram of an exemplary vehicle control system.

Referring now to FIG. 9D, the present invention implements a control system of a vehicle 430, a WLAN interface, and/or mass data storage of the vehicle control system. In some implementations, the present invention implement a powertrain control system 432 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

The present invention may also be implemented in other control systems 440 of the vehicle 430. The control system 440 may likewise receive signals from input sensors 442 and/or output control signals to one or more output devices 444. In some implementations, the control system 440 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 432 may communicate with mass data storage 446 that stores data in a nonvolatile manner. The mass data storage 446 may include optical and/or magnetic storage devices (for example, hard disk drives [HDDs] and/or DVDs). At least one HDD may have the configuration shown in FIG. 9A and/or at least one DVD may have the configuration shown in FIG. 9B. The HDD may be a mini HDD that includes one or more platters having a diameter that is smaller than approximately 1.8". The powertrain control system 432 may be connected to memory 447 such as RAM, ROM, low latency nonvolatile memory such as flash memory and/or other suitable electronic data storage. The powertrain control system 432 also may support connections with a WLAN via a WLAN network interface 448. The control system 440 may also include mass data storage, memory and/or a WLAN interface (all not shown).

Figure 9E:
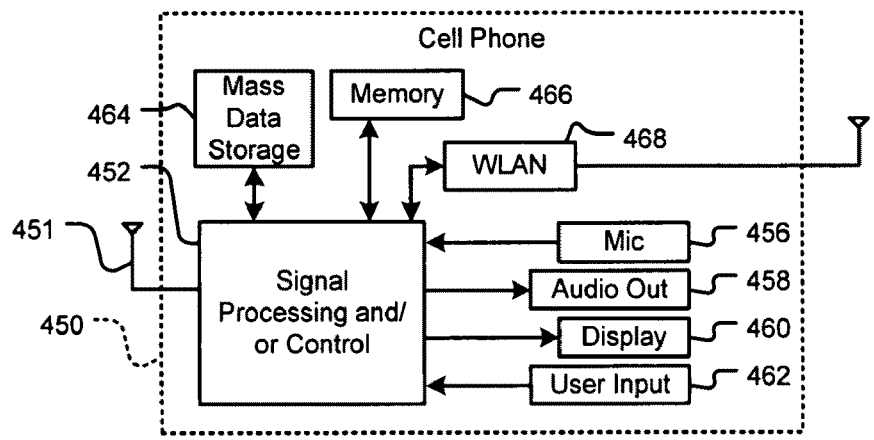
FIG. 9E is a diagram of an exemplary cellular or mobile phone.

Referring now to FIG. 9E, the present invention can be implemented in a cellular phone 450 that may include a cellular antenna 451. The present invention may implement signal processing circuits, which are generally identified in FIG. 9E at 452, a WLAN interface and/or mass data storage of the cellular phone 450. In some implementations, the cellular phone 450 includes a microphone 456, an audio output 458 such as a speaker and/or audio output jack, a display 460 and/or an input device 462 such as a keypad, pointing device, voice actuation and/or other input device. The signal processing circuits 452 and/or other circuits (not shown) in the cellular phone 450 may process data, perform coding and/or encryption, perform calculations, format data and/or perform other cellular phone functions.

The cellular phone 450 may communicate with mass data storage 464 that stores data in a nonvolatile manner such as optical and/or magnetic storage devices (for example, hard disk drives [HDDs] and/or DVDs). At least one HDD may have the configuration shown in FIG. 9A and/or at least one DVD may have the configuration shown in FIG. 9B. The HDD may be a mini HDD that includes one or more platters having a diameter that is smaller than approximately 1.8". The cellular phone 450 may be connected to memory 466 such as RAM, ROM, low latency nonvolatile memory such as flash memory and/or other suitable electronic data storage. The cellular phone 450 also may support connections with a WLAN via a WLAN network interface 468.

Figure 9F:
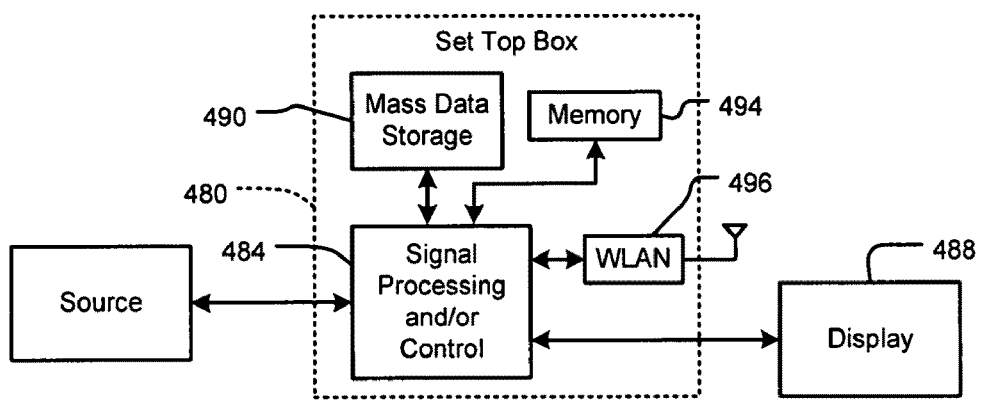
FIG. 9F is a diagram of an exemplary television set top box.
Figure 9G:
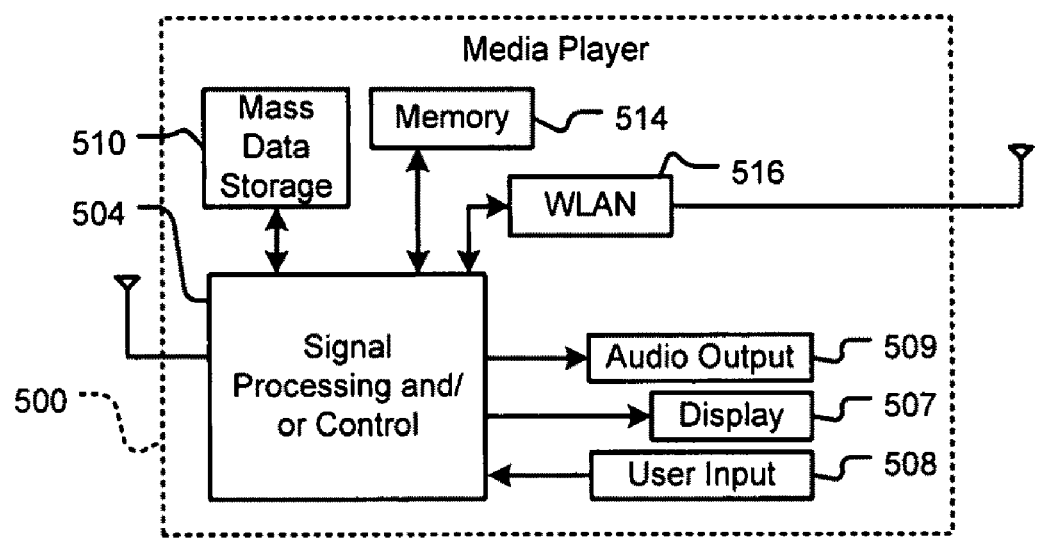
FIG. 9G is a diagram of an exemplary portable media player.

Referring now to FIG. 9F, the present invention can be implemented in a set top box 480. The present invention may implement signal processing circuits, which are generally identified in FIG. 9F at 484, a WLAN interface and/or mass data storage of the set top box 480. The set top box 480 receives signals from a source such as a broadband source and outputs signals standard and/or high definition audio/video signals suitable for a display 488 such as a television and/or monitor and/or other video and/or audio output devices. The signal processing circuits 484 and/or other circuits (not shown) of the set top box 480 may process data, perform coding and/or encryption, perform calculations, format data and/or perform any other set top box function.

The set top box 480 may communicate with mass data storage 490 that stores data in a nonvolatile manner. The mass data storage 490 may include optical and/or magnetic storage devices (for example, hard disk drives [HDDs] and/or DVDs). At least one HDD may have the configuration shown in FIG. 9A and/or at least one DVD may have the configuration shown in FIG. 9B. The HDD may be a mini HDD that includes one or more platters having a diameter that is smaller than approximately 1.8". The set top box 480 may be connected to memory 494 such as RAM, ROM, low latency nonvolatile memory such as flash memory and/or other suitable electronic data storage. The set top box 480 also may support connections with a WLAN via a WLAN network interface 496.

Referring now to FIG. 9F, the present invention can be implemented in a media player 500. The present invention may implement signal processing circuits, which are generally identified in FIG. 9G at 504, a WLAN interface and/or mass data storage of the media player 500. In some implementations, the media player 500 includes a display 507 and/or a user input 508 such as a keypad, touchpad and the like. In some implementations, the media player 500 may employ a graphical user interface (GUI) that typically employs menus, drop down menus, icons and/or a point-and-click interface via the display 507 and/or user input 508. The media player 500 further includes an audio output 509 such as a speaker and/or audio output jack. The signal processing circuits 504 and/or other circuits (not shown) of the media player 500 may process data, perform coding and/or encryption, perform calculations, format data and/or perform any other media player function.

The media player 500 may communicate with mass data storage 510 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices (for example, hard disk drives [HDDs] and/or DVDs). At least one HDD may have the configuration shown in FIG. 9A and/or at least one DVD may have the configuration shown in FIG. 9B. The HDD may be a mini HDD that includes one or more platters having a diameter that is smaller than approximately 1.8". The media player 500 may be connected to memory 514 such as RAM, ROM, low latency nonvolatile memory such as flash memory and/or other suitable electronic data storage. The media player 500 also may support connections with a WLAN via a WLAN network interface 516. Still other implementations in addition to those described above are contemplated.

CONCLUSION/SUMMARY

Thus, the present invention provides a methods and circuits for detecting amplitude drops in received signals, and systems and networks that utilize such detection. The circuits and methods may advantageously operate in the digital domain. Embodiments of the present invention also reduce the incidence of "false positives" due to transient low amplitudes. Accurate detection of amplitude drops can improve the accuracy of decoders.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method of detecting an amplitude drop in an incoming analog signal, said method comprising:
   sampling said incoming analog signal to produce a plurality of digital sample values;
   producing a plurality of drop flags in response to said plurality of digital sample values, wherein producing said plurality of drop flags comprises comparing at least one of said digital sample values to a first threshold and setting one of said drop flags to a first state when said at least one digital sample value is equal to or below said first threshold; and
   detecting said amplitude drop in response to at least two of said drop flags, wherein said detecting comprises selecting a subset of said drop flags, and determining that said amplitude drop has occurred when the number of drop flags in said subset having said first state exceeds a second threshold.

2. The method of claim 1, wherein said comparing comprises selecting a subset of said digital sample values and comparing the highest digital sample value in said subset to said threshold value.

3. The method of claim 2, wherein said selecting comprises selecting a plurality of sequential digital sample values.

4. The method of claim 2, wherein said selecting comprises selecting at least four sequential digital sample values.

5. The method of claim 1, wherein said digital sample values comprise values of an envelope of said incoming analog signal.

6. The method of claim 1, further comprising:
   producing an amplitude drop signal in response to said detecting;
   selectively decoding said incoming analog signal in response to said amplitude drop signal.

7. The method of claim 6, wherein decoding said incoming analog signal comprises Viterbi detection of said incoming analog signal.

8. A method of detecting an amplitude drop in an incoming signal, said method comprising:
   sampling said incoming signal to produce a plurality of sample values;
   producing a plurality of drop flags in response to said plurality of sample values; and
   detecting said amplitude drop by selecting a subset of said plurality of drop flags, wherein said selecting comprises selecting a plurality of sequential drop flags, and determining that said amplitude drop has occurred when the number of drop flags in said subset having a first state exceeds a threshold.

9. The method of claim 8, wherein producing said plurality of drop flags comprises:
   comparing at least one of said sample values to a threshold value; and setting one of said drop flags to a first state when said at least one sample value is equal to or below said threshold value.

10. The method of claim 8, wherein said selecting comprises selecting at least four sequential drop flags.

11. The method of claim 8, wherein said determining comprises calculating a moving average of said subset of drop flags.

12. The method of claim 8, wherein:
producing said plurality of drop flags comprises comparing at least one of said sample values to a first threshold and setting one of said drop flags to a first state when said at least one sample value is equal to or below said first threshold; and
said detecting comprises selecting a subset of said drop flags, and determining that said amplitude drop has occurred when the number of drop flags in said subset having said first state exceeds a second threshold.

13. A circuit for detecting an amplitude drop in an incoming analog signal, said circuit comprising:
a sampling circuit configured to produce a digital sample signal in response to said incoming analog signal;
a threshold circuit configured to produce a drop flag signal in response to said digital sample signal, wherein said threshold circuit comprises a comparison circuit configured to compare at least one digital sample value derived from said digital sample signal to a first threshold value, and said threshold circuit is further configured to produce said drop flag signal in response to an output of said comparison circuit; and
a drop detection circuit configured to produce an amplitude drop signal in response to at least two values of said drop flag signal, wherein said drop detection circuit is further configured to select a subset of drop flags derived from said drop flag signal, to compare the number of drop flags in said subset having a first state to a second threshold value, and to produce said amplitude drop signal in response to said comparison.

14. The circuit of claim 13, wherein said comparison circuit is further configured to select a subset of digital sample values derived from said digital sample signal and to compare the highest of said digital sample values in said subset to said threshold value.

15. The circuit of claim 14, wherein said comparison circuit is further configured to select a plurality of sequential digital sample values.

16. The circuit of claim 14, wherein said comparison circuit is further configured to select at least four sequential digital sample values.

17. The circuit of claim 13, wherein said sampling circuit is further configured to produce said digital sample signal in response to an envelope of said incoming analog signal.

18. A signal processor comprising:
the circuit of claim 13; and
a decoding circuit configured to selectively decode said incoming analog signal in response to said amplitude drop signal.

19. The signal processor of claim 18, wherein said decoder comprises a Viterbi detector.

20. A transceiver, comprising:
the circuit of claim 13;
a transmitter configured to transmit serial data to a network; and
a receiver communicatively coupled to said circuit and configured to receive serial data from said network.

21. The transceiver of claim 20, embodied on a single integrated circuit.

22. A system for transferring data on or across a network, comprising:
the transceiver of claim 20;
at least one transmitter port communicatively coupled to said transmitter for transmitting serial data to an external receiver; and
at least one receiver port communicatively coupled to said receiver for receiving said serial data.

23. The circuit of claim 13, further comprising an accumulator configured to accumulate a number of consecutive drop flags having said first state.

24. A circuit for detecting an amplitude drop in an incoming signal, said circuit comprising:
a sampling circuit configured to produce a sample signal in response to said incoming signal;
a threshold circuit configured to produce a drop flag signal in response to said sample signal; and
a drop detection circuit configured to select a subset of at least two sequential drop flag values derived from said drop flag signal, to compare the number of drop flag values in said subset having a first state to a threshold value, and to produce an amplitude drop signal in response to said comparison.

25. The circuit of claim 24, wherein said threshold circuit comprises a comparison circuit configured to compare at least one digital sample value derived from a sample digital signal to a threshold value, and said threshold circuit is further configured to produce said drop flag signal in response to an output of said comparison circuit.

26. The circuit of claim 24, wherein said drop detection circuit is further configured to select at least four sequential drop flag values.

27. The circuit of claim 24, wherein said drop detection circuit is further configured to calculate a moving average of said subset of drop flag values.

28. The circuit of claim 24, wherein:
said threshold circuit comprises a comparison circuit configured to compare at least one digital sample value derived from a digital sample signal to a threshold value, and said threshold circuit is further configured to produce said drop flag signal in response to an output of said comparison circuit; and
said drop detection circuit is further configured to select a subset of drop flags derived from said drop flag signal, to compare the number of drop flags in said subset having a first state to a threshold value, and to produce said amplitude drop signal in response to said comparison.

29. The circuit of claim 24, wherein said sampling circuit is further configured to produce said sample signal in response to an envelope of said incoming signal.

30. The circuit of claim 24, further comprising an accumulator configured to accumulate a number of consecutive drop flags having said first state.

\* \* \* \* \*